United States Patent [19]

Ikematu et al.

[11] Patent Number: 5,159,022

[45] Date of Patent: Oct. 27, 1992

[54] CRYSTALLINE BLOCK COPOLYMER AND PROCESS FOR PRODUCING THE SAME

[75] Inventors: Takeshi Ikematu, Musashino; Hideo Morita; Akiyoshi Hirata, both of Yokohama, all of Japan

[73] Assignee: Asahi Kasei Kogyo Kabushiki Kaisha, Osaka, Japan

[21] Appl. No.: 703,698

[22] Filed: May 21, 1991

Related U.S. Application Data

[63] Continuation of Ser. No. 342,653, Apr. 25, 1989, abandoned, which is a continuation of Ser. No. 17,235, Feb. 20, 1987, abandoned.

[30] Foreign Application Priority Data

Feb. 20, 1986 [JP] Japan .................. 61-33945
Mar. 17, 1986 [JP] Japan .................. 61-57096
May 23, 1986 [JP] Japan .................. 61-117188

[51] Int. Cl.$^5$ ................ C08F 297/04; C08L 53/02
[52] U.S. Cl. .................... 525/250; 525/249; 525/271; 525/272; 525/314; 524/534
[58] Field of Search .............. 525/271, 272, 314, 249, 525/250; 524/534

[56] References Cited

U.S. PATENT DOCUMENTS

| | | | |
|---|---|---|---|
| 4,080,492 | 3/1978 | De Zarauz | 526/177 |
| 4,355,156 | 10/1982 | Bingham et al. | 528/413 |
| 4,503,204 | 3/1985 | Bingham et al. | 526/187 |
| 4,616,065 | 10/1986 | Hargis et al. | 525/237 |
| 4,689,368 | 8/1987 | Jenkins | 525/314 |

FOREIGN PATENT DOCUMENTS 0091287 10/1983 European Pat. Off. .

Primary Examiner—James J. Seidleck
Assistant Examiner—Vasu S. Jagannathan
Attorney, Agent, or Firm—Birch, Stewart, Kolasch & Birch

[57] ABSTRACT

A crystalline block copolymer containing at least a triblock or at least a radial structure and a process for producing the same, wherein at least one block comprising a vinyl aromatic compound having a glass transition temperature (Tg) of not lower than 50° C., at least one block comprising a conjugated diene polymer having a 1,4-trans linkage content, a Tg not higher than 10° C. and crystallinity at 25° C. and in which the crystalline block copolymer optionally which contains the radial structure further comprises a coupling agent. The polymer or the composition containing the same can be utilized for fixing materials of affected portions for medical purposes, protector materials for various sports, films, laminates, toys, artificial flowers, heat-sensitive sensors, coupling devices, insulating materials, framework materials, etc.

37 Claims, 1 Drawing Sheet

CRYSTALLINE BLOCK COPOLYMER AND PROCESS FOR PRODUCING THE SAME

This application is a continuation of application Ser. No. 07/342,653 filed on Apr. 25, 1989, which is a continuation of application Ser. No. 07/017,235 filed on Feb. 20, 1987, both now abandoned.

TECHNICAL FIELD

The present invention relates to a novel block copolymer comprising a conjugated diene and a vinylaromatic compound and a process for producing the same. More specifically, the present invention relates to a block copolymer containing at least a set of 1,4-transconjugated diene polymer block having crystallinity at 25° C. sandwiched, between two or more vinylaromatic hydrocarbon polymer blocks each having a glass transition temperature of not lower than 50° C. and a process for producing the same.

BACKGROUND ART

A preparation technique of using an $I_A$ metal compound such as organic lithium, etc., as the polymerization catalyst can give a block copolymer of a vinylaromatic monomer and a conjugated diene monomer. This technique is accomplished by utilizing its living anion polymerization characteristic of successively polymerizing a vinylaromatic monomer and a conjugated diene monomer, and also, if necessary, performing the terminal coupling reaction. These block copolymers, when containing a relatively small amount of the vinylaromatic compound, have an elasticity at normal temperatures similar to vulcanized natural rubber or synthetic rubber, and yet can be processed at higher temperatures similarly as thermoplastic resins. For this reason, they are called thermoplastic elastomers, and have been widely used in the field of plastic modifiers, tackifiers, etc. On the other hand, when the content of the vinylaromatic compound is relatively high, thermoplastic resins excellent in transparency and impact resistance can be obtained and they have been widely utilized, primarily in the field of packaging vessels for foods. However, the trans-linkage content at the conjugated diene portion of the polymer obtained according to such a process will generally never exceed 60%, and thus no block copolymer having a crystalline trans-conjugated diene polymer block have ever been obtained.

On the other hand, conjugated diene polymers having higher trans-1,4-linkage content have been known to have been produced according to the three techniques shown below.

(1) The preparation technique of using a Ziegler catalyst containing a transition metal as the main component.

(2) The preparation technique of using an anion polymerization catalyst system comprising an alkaline earth metal compound as the main component.

(3) The preparation technique of using a catalyst system comprising a rare earth metal compound as the main component.

The first technique which comprises using a transition metal such as nickel, cobalt, titanium, vanadium, etc., as the main component has been known to effect a high degree of stereoregular polymerization of a conjugated diene monomer. However, due to low living polymerization activity and low copolymerizability with a vinylaromatic monomer, it has been difficult to produce a block copolymer of a conjugated diene monomer and a vinylaromatic monomer according to these preparation techniques.

As to the second technique, there is an example in which an organometal compound of $II_A$ metal is used as the polymerization catalyst, but an organometallic compound of $II_A$ metal other than beryllium, magnesium can be generally synthesized but only with difficulty, and their polymerization activities were also markedly low. While organometallic compounds of beryllium and magnesium can be synthesized with relative ease, polymerization activity for conjugated dienes cannot be exhibited except for special reaction conditions, and only polymers having low molecular weight could be obtained. In contrast, as the method in which a $II_A$ metal salt of an organic acid of metals such as barium and strontium is combined with other organometallic compounds, the methods have been known in which polymerization of a conjugated diene monomer is conducted by using barium-di-tert-butoxide and an organolithium (U.S. Pat. No. 3,992,561), barium-ditert-butoxide and an organomagnesium (U.S. Pat. No. 3,846,385) or an organic compound of barium or strontium, an organolithium and an organometallic compound of $II_B$ or $III_A$ metal (U.S. Pat. No. 4,092,268), etc. In these methods, using a composite catalyst containing an $II_A$ metal compound, polymers having high molecular weight can be obtained and further copolymerization of a conjugated diene monomer with a vinylaromatic monomer is possible. However, when it is desired to obtain a polymer exhibiting crystallinity with high stereoregularity having a trans-linkage content at the conjugated diene portion exceeding 80%, the polymerization temperature is required to be made lower, whereby polymerization activity becomes lower. Particularly, when it is desired to subject a conjugated diene monomer and a vinylaromatic monomer to block copolymerization, the reaction is required to be completed for each block of polymerization reaction, and therefore high living characteristic is demanded for the active terminals. Accordingly, although there is an example in which a diblock copolymer of butadiene and styrene with a relatively lower molecular weight is obtained (U.S. Pat. No. 4,355,156), there is no block copolymer obtained with a structure as intended by the present invention.

Further, as to the third technique, there has been known a polymerization catalyst comprising an organoneodymium salt of Versatic Acid and an organomagnesium (European Patent 0091287). According to this technique, although a crystalline butadiene polymer having high trans-linkage content can be obtained, polymerization activity, particularly copolymerizability with a vinylaromatic monomer such as styrene, etc., is remarkably low, and no block copolymer of a conjugated diene monomer and vinylaromatic monomer has been obtained.

In the techniques using the polymerization catalysts of the prior art as described above, problems are involved in their catalyst characteristics, and therefore no block copolymer containing a crystalline conjugated diene polymer block having a trans-linkage content at the conjugated diene portion of 80% or higher sandwiched between two or more polymer blocks of vinylaromatic compounds as purposed for by the present invention has been obtained, and no such kind of polymer has been known up to date.

Under such a situation, the present inventors have investigated intensively about the method for preparation of a copolymer containing a crystalline trans-conjugated diene polymer block and vinylaromatic compound polymer blocks and consequently developed a process for producing the same, and found that the copolymer obtained has extremely specific properties which enables the present invention to be accomplished.

DISCLOSURE

Figure 1:
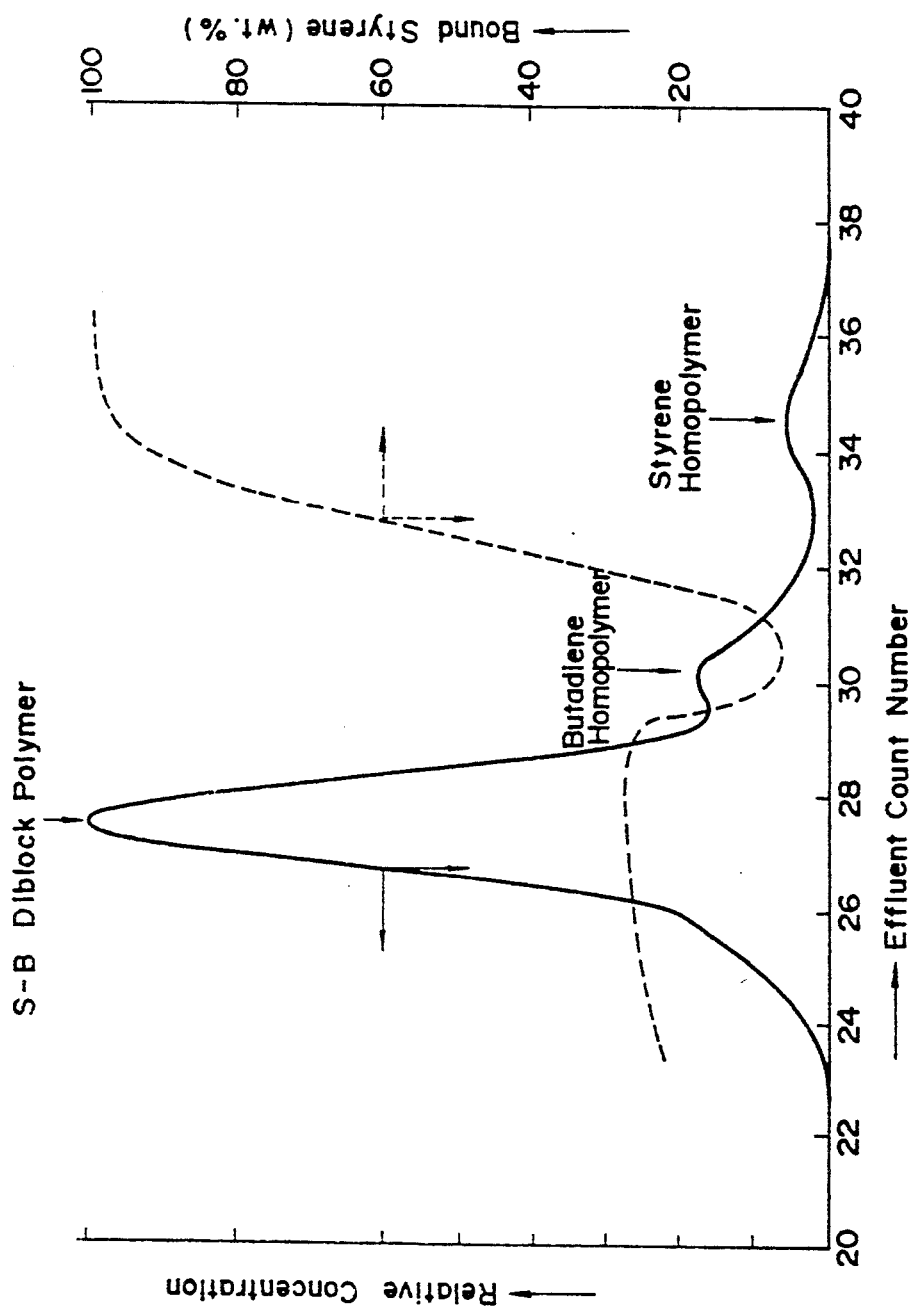
FIG. 1 is a graph showing the GPC measurement results of the polymer prepared in Example 1.

More specifically, the present invention relates to a crystalline block copolymer containing at least a triblock chain represented by the formula A-B-C or at least a radial structure represented by the formula (D-E$)_n$X in the polymer chain and a process for producing the same. In the formula, A, C and D each represents a block of a homopolymer of a vinylaromatic compound or a copolymer of a vinylaromatic compound with another vinylaromatic compound or a conjugated diene compound having a glass transition temperature (tg) of not lower than 50° C. and having a weight average molecular weight in the range of from 2,000 to 100,000; B and E each represent a block comprising a homopolymer of a conjugated diene compound or a copolymer of a conjugated diene compound with another diene compound or a copolymer of a conjugated diene compound having less than 20 wt. % of a vinylaromatic compound having a 1,4-trans linkage content at the conjugated diene portion of 80% or higher, having weight average molecular weights in the range of from 25,000 to 1,000,000 and from 10,000 to 500,000 respectively, a glass transition temperature of not higher than 10° C. and crystallinity at 25° C.; X is a terminal coupling agent; and n is an integer of from 2 to 10.

Such crystalline block copolymers exhibit different characteristics depending primarily on their composition ratios of conjugated diene and vinylaromatic compound.

The following cases may be included.

(1) In the case where the content of the vinylaromatic compound is relatively small, and since the conjugated diene block portion tends to be remarkably oriented and crystallized, a thermoplastic resin which is remarkably high in hardness and strength and excellent in resilience is obtained.

Particularly, when the content of the vinylaromatic compound in the crystalline block copolymer is 5 to 60 wt. %, preferably 20 to 40 wt. %, and the melting point of the conjugated block is 25° C. or higher and lower than the glass transition temperature of the vinylaromatic hydrocarbon block, preferably lower by 10° C. or more than the glass transition temperature, the polymer exhibits an excellent shape memorizing characteristic.

For example, when a sample of such a polymer molded at a temperature exceeding the glass transition temperature of the vinylaromatic hydrocarbon block is deformed at a temperature lower than the glass transition temperature of the vinylaromatic hydrocarbon block and at which most of the conjugated diene block is melted and cooled to near the room temperature, whereby this shape is frozen and retained, and when this is again heated to the temperature used during deformation of the conjugated diene block, the shape of the sample molded can be rapidly restored, thus showing an excellent shape memorizing characteristic.

(2) In the case, when the content of the vinylaromatic compound is relatively higher, a thermoplastic resin having high hardness and strength and excellent impact resistance can be obtained.

Thus, an object of the present invention is to provide a crystalline block copolymer having various excellent characteristics as mentioned above.

An object of the present invention is to provide a crystalline block copolymer containing at least a triblock chain represented by the formula A-B-C in the polymer chain, or a crystalline block copolymer containing at least a radial structure represented by the formula (D-E$)_n$X in the polymer chain.

In the above formulae, A, C and D each represent a block comprising a homopolymer of a vinylaromatic compound or a copolymer of a vinylaromatic compound with another vinylaromatic compound or a conjugated diene compound having a glass transition temperature of not lower than 50° C. and a weight average molecular weight in the range of from 2,000 to 100,000.

If the glass transition temperature of the blocks of A, C and D is lower than 50° C., the physical properties such as strength and elongation, etc., of the copolymer obtained will be undesirably lowered remarkably. Also, if the weight average molecular weight is less than 2,000, the physical properties such as strength and elongation, etc., of the copolymer will be undesirably lowered. On the other hand, if the molecular weight exceeds 100,000, processability of the copolymer will be undesirably remarkably lowered. The blocks of A, C and D should preferably be a homopolymer of a vinylaromatic compound or a copolymer of a vinylaromatic compound with another vinylaromatic compound, but it may be also a random or tapered copolymer of a vinylaromatic compound with less than 50 wt. % of a conjugated diene compound.

The blocks of B and E have respective weight average molecular weights in the range of 25,000 to 1,000,000 and from 10,000 to 500,000, having a glass transition temperature not higher than 10° C. and crystallinity at 25° C., which is a homopolymer of a conjugated diene compound, or a copolymer of a conjugated diene compound with another conjugated diene compound or a copolymer of a conjugated diene compound and less than 20 wt. % of a vinylaromatic compound respectively having a 1,4-trans linkage content at the conjugated diene portion of 80% or higher.

If the weight average molecular weight of the block B is less than 25,000 or the weight average molecular weight of the block E is less than 10,000, the physical properties such as elongation and resilience, etc., of the copolymer obtained will be undesirably lowered. If the respective weight average molecular weights of the blocks B and E exceed 1,000,000 or 500,000, processability of the copolymer obtained will be undesirably remarkably lowered.

Also, if the glass transition temperature of the blocks of B and E exceeds 10° C., the resilience or shape memorizing characteristic of the copolymer obtained will be undesirably lowered.

The blocks of B and E must have crystallinity at 25° C. That is, its melting point must be 25° C. or higher. Blocks of B and E have preferably a melting point of 25° C. or higher, which are lower than the glass transition temperature of the block of the corresponding blocks A, C or D, preferably lower by 10° C. or lower than the glass transition temperature.

When the blocks of B and E has no crystallinity at 25° C., the resultant copolymer will be lowered in hardness and strength, and its shape memorizing characteristic will be undesirably remarkably lowered.

Also, if the 1,4-trans-linkage content at the conjugated diene portion in the blocks of B and E is less than 80%, the resultant copolymer will be lowered in strength and elongation, and the shape memorizing characteristic will be undesirably remarkably lowered.

Further, the block of B and E are each a homopolymer of a conjugated diene compound, a copolymer of a conjugated diene compound with another conjugated diene compound or a copolymer of a conjugated diene compound having less than 20 wt. % of a vinylaromatic compound, and a content of the vinylaromatic compound in the block in excess of 20 wt. % will result in undesirable lowering in resilience or a shape memorizing characteristic of the copolymer obtained. The mode of copolymerization may be either random copolymerization or tapered copolymerization.

In the crystalline block copolymer of the present invention, other than the above blocks of A, B, C or the blocks of D and E, blocks having structures not defined in the present invention such as conjugated diene polymer blocks having less than 80% of 1,4-trans-linkage content, etc., may also be contained between the respective blocks or outside of the blocks in the polymer chain, to the extent which does not lose the basic characteristics of the polymer of the present invention.

In the formula representing the structure of the crystalline block copolymer of the present invention, n is an integer of 2 or more, and 10 or less. If n is 1, the physical properties such as strength, elongation, etc., of the polymer obtained will be remarkably lowered, and also the shape memorizing characteristic will be undesirably lowered. On the other hand, if n is 11 or higher, processability will be undesirably remarkably lowered. X shows a terminal coupling agent, and may be selected generally from the coupling agents used in the terminal coupling reaction in anion polymerization of conjugated dienes.

Examples of the monomers constituting the crystalline block copolymer of the present invention may include, as vinylaromatic compounds, styrene, α-methylstyrene, p-methylstyrene, m-methylstyrene, o-methylstyrene, p-tert-butylstyrene, dimethylstyrene, vinylnaphthalene, etc., and, as conjugated diene compounds, butadiene, isoprene, piperylene, etc. Particularly preferable monomers are styrene and butadiene, respectively.

The crystalline block copolymer of the present invention may also contain, in addition to the triblock copolymer of the above formula A-B-C and the radial block copolymer of the formula (D-E)$_n$X, impurities formed as a matter of course during polymerization, such as 1,4-trans-conjugated diene polymer, vinylaromatic compound polymer, diblock copolymer comprising 1,4-transconjugated diene polymer block and a vinylaromatic compound block. However, also in this case, the effect of the present invention cannot be fully exhibited, unless 30 wt. % or more of the A-B-C triblock copolymer or the (D-B)$_n$X radial block copolymer is contained.

The crystalline block copolymer of the present invention can be used alone, but it may be sometimes preferably used as a mixture with other polymers for further improvement of softening temperature, rigidity, strength, resilience, moldability, etc., of the polymer depending on the use. However, also in this case, the effect of the present invention intended by the present invention cannot be fully exhibited unless at least 30% or more of the crystalline block copolymer is contained as the polymer component. Particularly preferable examples which can be mixed may include crystalline polymers having low melting points within the range of from 25° C. to 150° C. such as transbutadiene polymers, transisoprene polymers, ε-caprolactone polymers, etc., and polymers having aromatic nuleus such as styrene polymers, styrene-butadiene copolymers, α-methylstyrene polymers, cumarone-indene resins, polyphenylene ether, etc.

Further, other than the above polymeric components, inorganic fillers or plasticizers can be also formulated if desired for controlling rigidity or plasticity, etc. Also, stabilizers, pigments, etc., which are general additives to be added in polymeric resin materials can be also added conveniently similarly as in the prior art resin materials.

The amount of inorganic fillers to be used may be 5 to 100 parts by weight per 100 parts by weight of the polymeric components. Examples of inorganic fillers may include titanium oxide, calcium carbonate, clay, talc, mica, bentonite, silica, carbon, etc. Use of inorganic fillers in excess of 100 parts by weight will undesirably lower the impact strength of the polymeric resin material obtained.

The amount of the plasticizers used may be generally within the range of from 1 to 20 parts by weight per 100 parts by weight of the polymeric components. Examples of the plasticizers may include dibutyl phthalate, di-(2-ethylhexyl) phthalate, di-(2-ethylhexyl) adipate, diethylene glycol dibenzoate, butyl stearate, butylepoxy stearate, tri-(2-ethylhexyl) phosphate, various petroleum oils, etc.

The crystalline block copolymer of the present invention can be mixed easily by an extruder, a kneader, rolls, etc. These devices can be set at temperatures which can be freely selected within the range of from 60° to 200° C., but preferably from 80° to 180° C. Also, they can be mixed in a solution by dissolving in a suitable solvent.

The polymer or the polymer composition thus obtained can be utilized for various resin materials by making avail of the specific features thereof, namely the specific features in the physical properties such as shape memorizing characteristic, rigidity, strength, impact strength, etc., and processability such as injection moldability, low temperature workability, reworkability, etc.

For example, (1) they can be utilized for fixing materials of affected portions for medical purposes such as splint, plaster cast, etc., and protector materials for various sports by making avail of specific features primarily of rigidity, impact resistance and low temperature workability, (2) for heat-shrinkable films, laminates provided with heat shrinkability by application of previous stretching treatment, (3) for toys, dolls, artificial flowers or heat-sensitive sensors by making avail of its excellent shape memorizing characteristic, (4) for heat-shrinkable sleeve, coupling device, insulating material of wires in electrical products by utilizing, securing or coating by heating shrinkage, (5) for various frame work materials, frame work material of head portion for wigs, by making avail of the specific feature of fitness to the mold surface by heat shrinkage and possibility of heated working and modification at fine portions.

Another object of the present invention is to provide a process for preparing a novel copolymer comprising vinylaromatic hydrocarbon polymer blocks and crystalline trans-1,4 conjugated diene polymer block having various excellent characteristics as described above. The preparation techniques are classified and described in detail below. (1) A crystalline block copolymer containing the triblock chain represented by the formula of A-B-C can be prepared, by using a composite catalyst comprising the catalyst components (a), (b) and (c), or (a), (b), (c) and (d) as shown below, and by polymerizing successively the monomers selected from vinylaromatic monomers, conjugated diene monomers or mixtures thereof, wherein (a) is an organic compound of barium or strontium;
(b) is an organic compound of lithium;
(c) is an organomagnesium compound;
(d) is an organoaluminum or organozinc compound.

The essential catalyst components in the process of the present invention are (a), (b) and (c), whereby the object of the present invention can be fully accomplished, but the catalyst component (d) can also be used in combination if desired. By using the catalyst component (d) in combination, sometimes there may be the effect of improvement of catalytic activity or increase of the trans-linkage content at the conjugated diene portion.

The amount of the organomagensium which is the catalyst component (c) to be used, which may also depend on the molecular weight of the desired polymer, may be generally within the range of from 0.1 to 50 mmols per 100 g of the total monomers, preferably from 0.5 to 5 mmol. If the amount of the organomagnisium used is less than 0.1 mmol, the polymerization activity of the catalyst will be generally remarably lowered , and the molecular weight of the polymer obtained will be remarkably increased to make processability difficult. On the other hand, at an amount of the organomagnesium content in excess of 50 mmols, the molecular weight of the polymer obtained will become undesirably lower.

The amount of the organic compound of lithium which is the catalyst component (b) to be used may be within the range of from $Li/Mg=0.1$ to 10 as represented in terms of molar ratio of lithium to magnesium, preferably from 0.5 to 2. At a lithium content of less than $Li/Mg=0.1$, polymerization activity, particularly polymerization initiation rate will be undesirably lowered remarkably. On the other hand, at a lithium content over $Li/Mg=10$, at the stage of polymerization of the conjugated diene monomer, the ratio of 1,4-trans linkage of the conjugated diene will be lowered to a great extent, whereby the polymer obtained becomes non-crystalline and the object of the present invention cannot be accomplished.

The amount of the catalyst component (a) to be used, namely the organic compound of barium or strontium may be within the range of $Me^1/Mg=0.005$ to 10 ($Me^1$ is barium or strontium metal) as represented in terms of molar ratio relative to magnesium, preferably from 0.1 to 1. At a ratio less than $Me^1/Mg=0.005$, at the stage of polymerization of the conjugated diene monomer, the ratio of 1,4-trans linkage of the conjugated diene will be lowered to a great extent, whereby the polymer obtained becomes non-crystalline and the objects of the present invention cannot be accomplished. On the other hand, at a content over $Me^1/Mg=10$, the polymerization activity of the composite catalyst will be undesirably remarkably lowered.

In the composite catalyst used in the preparation process of the present invention, further in addition to the above catalyst components (a), (b) and (c), an organoaluminum or organozinc may be also used as the catalyst component (d), if desired. The amount of the catalyst component (d) used may be $Me^2/Mg=50$ or less ($Me^2$ represents aluminum or zinc metal), preferably $Me^2/Mg=5$ or less, particularly preferably 1 or less. By addition of the catalyst component (d), the ratio of the 1,4-trans linkage at the conjugated diene portion can be increased, but the polymerization activity of the composite catalyst will be undesirably remarkably lowered at an amount in excess of $Me^2/Mg=50$.

(2) A crystalline block copolymer containing the radial structure represented by the formula $(D-E)_nX$ can be prepared according to a process, which comprises using the composite catalyst comprising the catalyst components (a), (b) and (c) or (a), (b), (c) and (d), polymerizing successively the monomers selected from vinylaromatic monomers, conjugated diene monomers or mixtures thereof, and thereafter carrying out the reaction with addition of a coupling agent, wherein (a) is an organic compound of barium or strontium;
(b) is an organic compound of lithium;
(c) is an organomagnesium compound;
(d) is an organoaluminum or organozinc compound.

The essential catalyst components in the present preparation process are (a), (b) and (c), and the object can be accomplished by using these, but the catalyst component (d) can be also used if desired. Use of the catalyst component (d) in combination may sometimes have the effect of improving the catalyst activity or increasing the trans-linkage content at the conjugated diene portion.

The preferable amounts and composition of the catalyst components used and their effects are the same as described above.

As the coupling agent, there may be employed coupling agents generally used in the terminal coupling reaction in anion polymerization of conjugated dienes. Examples of useful coupling agents may include multiepoxide, multi-isocyanate, multi-imine, multi-aldehyde, multi-ketone, multi-acid anhydride, multi-ester, monoester, multihalide, carbon monoxide and carbon dioxide. Particularly preferable coupling agents are silicon multihalide compounds such as tetrachlorosilane, trichloromonomethylsilane, trichloromonoethylsilane, dichlorodiethylsilane, etc., tin multihalide compounds such as tetrachloro tin, trichloromonomethyl tin, etc., ester compounds such as diphenylcarbonate, methylbenzoate, ethylbenzoate, diethyladipate, etc. The amount of the coupling agent used may be considered to be optimum for maximum branching when used in an amount equivalent to the organic metal employed. However, depending on the degree of coupling desired, the amount within any range of a coupling agent may be available. Generally, the amount of a coupling agent used is in the amount of 0.1 to 1.5 equivalent of an organomagnesium. The coupling agent may be added alone or as a solution in an inert hydrocarbon. The coupling agent may be added at once, in divided portions or continuously. The coupling reaction may be conducted under conditions which may also differ, but generally the reaction is conducted at a temperature approximate to the polymerization temperature and for a period of several minutes to several hours.

(3) Another process for preparing the crystalline block copolymer containing the radial structure represented by the formula $(D-E)_n-X$ comprises, copolymerizing a vinylaromatic monomer or conjugated diene monomer by using a composite catalyst comprising the catalyst components (b) and (c), and then with addition of the catalyst component (e) homopolymerizing a conjugated diene monomer or copolymerizing with one or more of other conjugated diene monomers or aromatic vinyl monomers, and then carrying out the reaction with the addition of a coupling agent:

(b) is an organic compound of lithium;
(c) is an organomagnesium compound; and
(e) is a rare earth metal salt of an organic acid.

The amount of the organomagnesium employed, which may also depend on the molecular weight of the desired polymer, may generally be from 0.1 to 50 mmols, preferably 0.5 to 5 mmols, per 100 g of the total monomers. If the organomagnesium compound used is less than 0.1 mmol, the polymerization activity of the catalyst will be generally remarkably lowered and the molecular weight of the polymer obtained will be remarkably increased to ensue the problem such that processability of the polymer becomes undesirably difficult. On the other hand, if the content of organomagnesium is in excess of 50 mmols, rare earth metal the molecular weight of the polymer obtained becomes remarkably lower, which is generally undesirable.

On the other hand, the amount of the organic compound of lithium may be in the range of $Li/Mg = 0.1$ to 10, preferably 0.5 to 2 as represented in terms of molar ratio of lithium to magnesium. At a lithium content less than $Li/Mg = 0.1$, polymerization activity during polymerization of the vinylaromatic monomer prior to addition of the rare earth metal compound will be undesirably remarkably lowered. On the other hand, at a lithium content over $Li/Mg = 10$, at the stage of polymerization of conjugated diene monomer by addition of the rare earth metal compound, the ratio of the 1,4-trans linkage of conjugated dienes will be lowered to a great extent, whereby the polymer obtained becomes non-crystalline and the objects of the present invention cannot be accomplished.

In the preparation process of the present invention, generally after polymerization of the block of vinylaromatic hydrocarbon polymers, a rare earth metal salt of an organic acid is added and after the reaction, the second stage polymerization of crystalline trans conjugated diene polymer block is carried out, and if necessary it is possible to obtain substantially the same results by simultaneous addition of the rare earth metal salt of an organic acid and the conjugated diene monomer.

The amount of the rare earth metal salt of an organic acid used may be within the range of $Ln/Mg = 0.01$ to 1, preferably 0.05 to 0.5 in terms of molar ratio relative to the organomagnesium compound used.

If the amount of the organic acid salt of rare earth metal used is less than 0.01 of $Ln/Mg$, the ratio of the 1,4-trans linkage of conjugated diene will be lowered to a great extent, whereby the polymer obtained will undesirably become non-crystalline. On the other hand, if $Ln/Mg$ is in excess of 1, the polymerization activity will be lowered to a great extent undesirably.

In adding the rare earth metal salt of an organic acid, further an organic compound of lithium, an organomagnesium or an organoaluminum or organozinc compound may be added to the polymerization system previously mixed with the rare earth metal salt of an organic acid or directly for increasing the 1,4-trans linkage of conjugated diene or promoting the living growth of the reaction terminals.

The types of coupling agents to be reacted and the reaction conditions to be used after polymerization are the same as described above.

After the reaction, stabilizers and antioxidants, known in this field of art, can be added to the polymer and further recovered according to the method known in this field of art. Particularly preferable examples of stabilizers and antioxidants may include 2,6-di-tert-butyl-4-methylphenol, tri-nonylphenylphosphate, phenyl-β-naphthylamine, N,N'-dialkyldiphenylamine, N-alkyl-diphenylamine, etc. As the method for recovery of the polymer, steam stripping, heating drying, etc., may be employed.

Examples of the vinylaromatic monomer which can be used in the present invention may include styrene, α-methylstyrene, p-methylstyrene, m-methylstyrene, o-methylstyrene, p-tert-butylstyrene, dimethylstyrene, vinylnaphthalene, etc. Particularly preferable vinylaromatic monomer is styrene.

As the copolymerizable conjugated diene, butadiene, isoprene, piperylene, etc., may be employed. Particularly preferable conjugated diene is butadiene.

Polymerization can be practiced in the absence or presence of a solvent. In the latter case, useful solvents may include aliphatic or alicyclic hydrocarbons such as n-pentane, n-hexane, n-heptane, cyclohexane, etc., aromatic hydrocarbons such as benzene, toluene, etc. Also, the solvent may contain partially polar organic compounds containing no active hydrogen such as tertially amines and ethers for the purpose of accelerating the polymerization reaction, improving solubility of the catalyst, etc.

The polymerization temperature may be $-30°$ C. to $150°$ C., preferably $50°$ C. to $120°$ C.

The polymerization reaction system is not particularly limited, but generally the batch method is preferred.

The organic compound of barium or strontium which is the catalyst component (a) of the composite catalyst to be used in the preparation process of the present invention may be selected from among those represented by the following formulae (I) to (VIII).

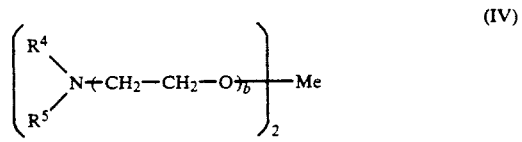

-continued

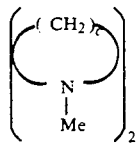
(VI)

$(R^8OSO_3)_{\frac{1}{2}}Me$ (VII)

$(R^9SO_3)_{\frac{1}{2}}Me$ (VIII)

(wherein $R^1$, $R^2$, $R^3$, $R^4$, $R^5$, $R^6$, $R^7$, $R^8$ and $R^9$ each represent an aliphatic hydrocarbon group or an aromatic hydrocarbon group, a and b each represents an integer of 6 or less, c represents an integer of 2 to 8, X represents oxygen or sulfur atom, and Me represents a metal of barium or strontium).

Examples of the above formula (I) may include barium or strontium salts of alcohols, phenols, thioalcohols, or thiophenols such as ethyl alcohol, n-propyl alcohol, iso-propyl alcohol, n-butyl alcohol, iso-butyl alcohol, 2-butyl alcohol, tert-butyl alcohol, n-amyl alcohol, n-hexyl alcohol, n-heptyl alcohol, n-octyl alcohol, cyclohexyl alcohol, allyl alcohol, cyclopentyl alcohol, benzyl alcohol, phenol, 1-naphthol, 2,6-ditert-butylphenol, 2,4,6-tri-tert-butylphenol, nonylphenol, 4-phenylphenol, ethanethiol, 1-butanethiol, thiophenol, cyclohexanethiol, 2-naphthalenethiol, etc.

Examples of the formula (II) may include barium or strontium salts of carboxylic acids or sulfur analogues such as isovaleric acid, caprylic acid, lauric acid, myristic acid, palmitic acid, stearic acid, oleic acid, linoleic acid, cyclopentanecarboxylic acid, naphthenic acid, ethylhexanoic acid, pivalic acid, Versatic Acid (synthetic acid constituted of a mixture of isomers of C10 mono-carboxylic acids sold by Shell Chemical Co.), phenylacetic acid, benzoic acid, 2-naphthoic acid, hexanethionic acid, 2,2-dimethylbutanethionic acid, decanethionic acid, tetradecanethionic acid, thiobenzoic acid and the like.

Examples of the formula (III) may include barium or strontium salts of ethylene glycol monomethyl ether, ethylene glycol monoethyl ether, ethylene glycol monobutyl ether, ethylene glycol monopropyl ether, diethylene glycol monomethyl ether, diethylene glycol monoethyl ether, diethylene glycol monobutyl ether, triethylene glycol monobutyl ether, diethylene glycol monophenyl ether, etc.

Examples of the formula (IV) may include barium or strontium salts of dimethylaminoethanol, diethylaminoethanol, di-n-propylaminoethanol, etc.

Examples of the formula (V) may include barium or strontium salts of secondary amines such as dimethylamine, diethylamine, di-n-propylamine, di-isopropylamine, di-n-butylamine, di-n-hexylamine, and the like.

Examples of the formula (VI) may include barium or strontium salts of cyclic imines such as ethyleneimine, triethyleneimine, pyrrolidine, piperidine, hexamethyleneimine, and the like.

Examples of the formula (VII) may include barium or strontium salts of butanesulfonic acid, hexanesulfonic acid, decanesulfonic acid, tridecanesulfonic acid, dodecylbenzenesulfonic acid, tetradecylbenzenesulfonic acid, octadecylbenzenesulfonic acid, dibutylnaphthalenesulfonic acid, di-iso-propylnaphthalenesulfonic acid, n-hexylnaphthalenesulfonic acid, dibutylphenylsulfonic acid, and the like.

Examples of the formula (VIII) may include barium or strontium salts of sulfate esters of lauryl alcohol, oleyl alcohol, stearyl alcohol, and the like.

The organic compounds of lithium which is the catalyst component (b) in the composite catalyst to be used in the preparation process of the present invention may be selected from organolithium or lithium salts of an organic acid represented by the following formula (IX) to (XIV).

$R^1(Li)_a$ (IX)

$R^2(XLi)_b$ (X)

$R^3O(CH_2CH_2O)_cLi$ (XI)

$R^4\diagdown$
$\quad N(CH_2CH_2O)_dLi$ (XII)
$R^5\diagup$ $R^6\diagdown$
$\quad N-Li$ (XIII)
$R^7\diagup$

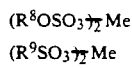
(XIV)

(wherein $R^1$, $R^2$, $R^3$, $R^4$, $R^5$, $R^6$ and $R^7$ each represents an aliphatic hydrocarbon group or an aromatic hydrocarbon group, a, b, c and d each represents an integer of 1 to 6, e represents an integer of 2 to 8, and X represents oxygen or sulfur atom).

Examples of the formula (IX) may include methyllithium, ethyllithium, n-propyllithium, isopropyllithium, n-butyllithium, sec-butyllithium, tert-butyllithium, isoamyllithium, sec-amyllithium, n-hexyllithium, n-octyllithium, allyllithium, benzylhexyllithium, phenyllithium, 1,1-diphenyllithium, tetramethylenedilithium, pentamethylenedilithium, 1,2-dilithio-1,1,2,2-tetraphenylethane, 1,3-bis(1-lithio-1,3-dimethylpentyl)benzene, and the like.

Examples of the formula (X) may include lithium salts of alcohols, phenols, thioalcohols and thiophenols such as ethyl alcohol, n-propyl alcohol, iso-propyl alcohol, n-butyl alcohol, iso-butyl alcohol, 2-butyl alcohol, tert-butyl alcohol, n-amyl alcohol, n-hexyl alcohol, n-heptyl alcohol, n-octyl alcohol, cyclohexyl alcohol, allyl alcohol, cyclopentyl alcohol, benzyl alcohol, phenol, 1-naphthol, 2,6-di-tert-butylphenol, 2,4,6-tri-tert-butylphenol, nonylphenol, 4-phenylphenol, ethanethiol, 1-butanethiol, thiophenol, cyclohexanethiol, 2-naphthalenethiol, and the like.

Examples of the formula (XI) may include lithium salts of ethylene glycol monomethyl ether, ethylene glycol monoethyl ether, ethylene glycol monobutyl ether, ethylene glycol monopropyl ether, diethylene glycol monomethyl ether, diethylene glycol monoethyl ether, diethylene glycol monobutyl ether, triethylene glycol monobutyl ether, diethylene glycol monophenyl ether, and the like.

Examples of the formula (XII) may include lithium salts of dimethylaminoethanol, diethylaminoethanol, di-n-propylaminoethanol, and the like.

Examples of the formula (XIII) may include lithium salts of secondary amines such as dimethylamine, diethylamine, di-n-propylamine, di-iso-propylamine, di-n-butylamine, di-n-hexylamine, and the like.

Examples of the formula (XIV) may include lithium salts of cyclic imines such as ethyleneimine, triethyleneimine, pyrrolidine, piperidine, hexamethyleneimine, and the like.

Particularly preferable organic compounds of lithium are alkyllithium having 2 to 10 carbon atoms such as n-butyllithium, sec-butyllithium and iso-amyllithium, etc.

The organomagnesium compound which is the catalyst component (C) in the composite catalyst to be used in the preparation process of the present invention is represented by the following formula (XV):

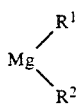  (XV)

(wherein $R^1$ and $R^2$ each represents an aliphatic hydrocarbon group or an aromatic hydrocarbon group, which may be either the same or different).

Also, the organomagnesium compound may also contain a small amount of organoaluminum or organozinc. etc., for improvement of its solubility in hydrocarbon solvents.

Examples of such compounds may include preferably diethylmagnesium, di-n-propylmagnesium, di-isopropylmagnesium, di-n-butylmagnesium, n-butyl sec-butylmagnesium, di-sec-butylmagnesium, di-tertbutylmagnesium, di-n-hexylmagnesium, di-n-propylmagnesium, diphenylmagnesium, MAGALA-6E [Texas Alkyl Co., molecular formula 6(n-$C_4H_9)_2Mg.(C_2H_5)_3Al$], MAGALA-7.5E [Texas Alkyl Co., molecular formula 7.5(n-$C_4H_9)_2. (C_2H_5)_3Al$], more preferably diisopropylmagnesium, di-n-butylmagnesium, di-sec-butylmagnesium, MAGALA-6E, MAGALA-7.5E, etc.

As the catalyst component (d) in the composite catalyst to be used in the preparation process of the present invention, there may be employed an organometallic compound selected from organoaluminum or organozinc.

The organoaluminum to be used may be represented by the following formula (XVI).

$$R^1-Al-R^2 \atop R^3$$  (XVI)

(wherein $R^1$, $R^2$ and $R^3$ are selected from hydrogen, aliphatic hydrocarbon groups or aromatic hydrocarbon groups, which may be either the same or different, but all should not be hydrogen atoms at the same time).

Examples of such compounds may include triethylaluminum, tri-iso-butylaluminum, tri-n-propylaluminum, tri-iso-propylaluminum, tri-n-hexylaluminum, diethylaluminum monohydride, and the like.

The organozinc to be used is represented by the following formula (XVII).

$$R^1-Zn-R^2$$  (XVII)

(wherein $R^1$ and $R^2$ are selected from hydrogen, aliphatic hydrocarbon groups or aromatic hydrocarbon groups which may be either the same or different, but both of $R^1$ and $R^2$ are not hydrogen).

Examples of such compounds may include diethylzinc, di-n-propylzinc, di-iso-amylzinc, di-iso-butylzinc, and the like.

The rare earth metal salt of an organic acid which is a catalyst component (e) in the composite catalyst to be used in the preparation process of the present invention is a salt of an organic acid represented by the following formulae (XVIII) to (XXV).

$$R^1-XH$$  (XVIII)

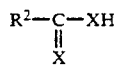  (XIX)

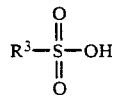  (XX)

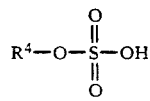  (XXI)

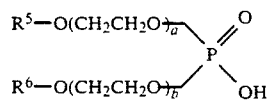  (XXII)

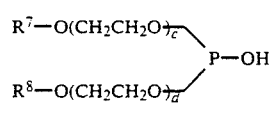  (XXIII)

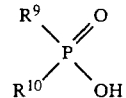  (XXIV)

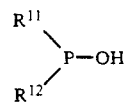  (XXV)

(wherein $R^1$ and $R^2$ and $R^5$-$R^8$ each represents a hydrocarbon group or an aromatic hydrocarbon group, $R^3$ represents an aromatic hydrocarbon group, $R^4$ represents an aliphatic hydrocarbon group, $R^9$-$R^{12}$ each represents an aliphatic hydrocarbon group, an aromatic hydrocarbon group, an alkoxy group or a phenoxy group; X represents an oxygen atom or a sulfur atom; and a, b, c and d each represents an integer of 1 to 6).

The above formula (XVIII) represents alcohols, thioalcohols, phenols or thiophenols. Examples of these may include methyl alcohol, ethyl alcohol, n-propyl alcohol, iso-propyl alcohol, tert-butyl alcohol, tert-amyl alcohol, n-hexyl alcohl, cyclohexyl alcohol, alyl alcohol, 2-butenyl alcohol, 3-hexenyl alcohol, 2,5-decadienyl alcohol, benzyl alcohol, phenol, catechol, 1-naphthol, 2-naphthol, 2,6-di-tert-butylphenol, 2,6-di-tert-butyl-4-methylphenol, 2,4,6-tri-tert-butylphenol, 4-phenylphenol, ethanethiol, 1-butanethiol, 2-pentane thiol, 2-iso-butanethiol, thiophenol, 2-naphthalenethiol, cyclohexanethiol, 3-methylcyclohexanethiol, 2-naphthalenethiol, benzenemethanethiol, 2-naphthalenemethanethiol, and the like.

The formula (XIX) represents carboxylic acids or sulfur analogues thereof. Examples of these may include isovaleric acid, caprylic acid, lauric acid, myristic acid, palmitic acid, stearic acid, oleic acid, linoleic acid, cyclopentanecarboxylic acid, naphthenic acid, ethylhexanoic acid, pivalic acid, Versatic Acid (synthetic acid constituted of a mixture of isomers of C10 monocarboxylic acids sold by Shell Chemical Co.), phenylacetic acid, benzoic acid, 2-naphthoic acid, hexanethionic acid, 2,2-dimethylbutane-thionic acid, decanethionic acid, tetradecanethionic acid, thiobenzoic acid, and the like.

The formula (XX) represents alkylallylsulfonic acids. Examples may include dodecylbenzenesulfonic acid, tetradecylbenzenesulfonic acid, hexadecylbenzenesulfonic acid, octadecylbenzenesulfonic acid, dibutylnaphthalenesulfonic acid, n-hexylnaphthalenesulfonic acid, dibutylphenylsulfonic acid, and the like.

The formula (XXI) represents monoalcohol esters of sulfuric acid. Examples of these may include sulfuric acid monoesters of lauryl alcohol, oleyl alcohol, stearyl alcohol, and the like.

The formula (XXII) represents phosphoric acid diesters of ethylene oxide adducts of alcohol or phenol. Examples of these may include phosphoric acid diester of ethylene oxide adduct of dodecyl alcohol, phosphoric acid diester of ethylene oxide adduct of octyl alcohol, phosphoric acid diester of ethylene oxide adduct of stearyl alcohol, phosphoric acid diester of ethylene oxide adduct of oleyl alcohol, phosphoric acid diester of ethylene oxide adduct of nonylphenol, phosphoric acid ester of ethylene oxide adduct of dodecylphenol, and the like.

The formula (XXIII) represents phosphite diesters of ethylene oxide adducts of alcohol or phenol. Examples of these may include phosphite diester of ethylene oxide adduct of dodecyl alcohol, phosphite diester of ethylene oxide adduct of stearyl alcohol, phosphite diester of ethylene oxide adduct of stearyl alcohol, phosphite diester of ethylene oxide adduct of nonylphenol, phosphite diester of ethylene oxide adduct of dodecylphenol, and the like.

The formula (XXIV) represents pentavalent organic phosphoric acid compounds. Examples of these may include dibutylphosphate, dipentylphosphate, dihexylphosphate, diheptylphosphate, dioctylphosphate, bis(-1methylheptyl)phosphate, bis(2-ethylhexyl)phosphate, dilaurylphosphate, dioleylphosphate, diphenylphosphate, bis(p-nonylphenyl)phosphate, (butyl)(2-ethylhexyl)phosphate, (1-methylheptyl)(2-ethylhexyl)phosphate, (2-ethylhexyl)(p-nonylphenyl)phosphate, monobutyl-2-ethyl-hexylphosphonate, mono-2-ethylhexylphenylphosphonate, mono-2-ethylhexyl-2-ethylhexylphosphonate, mono-p-nonyl-phenyl-2-ethylhexylphosphonate, dibutylphosphinic acid, bis(2-ethylhexyl)-phosphinic acid, bis(1-methylheptyl)-phosphinic acid, dilaurylphosphinic acid, dioleyl-phosphinic acid, diphenylphosphinic acid, bis(p-nonyl-phenyl)phosphinic acid, butyl(2-ethylhexyl)phosphinic acid, (2-ethylhexyl)(1-methylheptyl)phosphinic acid, (2-ethylhexyl)(p-nonylphenyl)phosphinic acid, and the like.

The formula (XXV) represents trivalent phosphoric acid compounds. Examples of these may include bis(2-ethylhexyl)phosphate, bis(1-methylheptyl)phosphate, mono-2-ethylhexyl-2-ethylhexylphosphonate, bis(2-ethylhexyl)phosphinic acid, and the like.

Useful rare earth metals are lanthanide elements of the atomic numbers 57 to 71, preferably elements of the atomic numbers 57 to 64, particularly preferably lanthanum, and cerium. These rare earth metals are not required to be particularly of high purity, but they may be a mixture with other rare earth elements, or may also contain a small amount of metal elements other than rare earth metals. The rare earth metal salt of an organic acid may also contain a small amount of unreacted organic acid.

As described in detail above, the present invention provides a novel crystalline block copolymer containing vinylaromatic hydrocarbon polymer block and crystalline trans-conjugated diene polymer blocks having various excellent characteristics---for example, various characteristics useful as excellent resin such as hardness, strength, resilience, etc. (and also having useful properties as shape memorizing resin) and further excellent impact resistance—and a process for preparation thereof.

EXAMPLES

The present invention is described in detail by referring to the following Examples, by which the scope of the present invention is not limited.

EXAMPLE 1

A polymerization reactor of 10 liter volume equipped with a stainless steel stirrer internally replaced with nitrogen gas is charged with 1.5 kg of a cyclohexane solution containing 20 wt. % of styrene previously purified and dried, and then 0.0113 mol of dibutyl magnesium (produced by Lithium Corp.; n-butyl : s-butyl about 1 : 1), 0.0113 mol of sec-butyl lithium as the catalyst components and 0.034 mol of tetrahydrofuran (THF) as the polymerization accelerator are added, followed by polymerization at 65° C. for 3 hours. At this point, a small amount of the polymerized solution is sampled from the reactor for analysis. As the result, the polymerization conversion by gas chromatograph analysis is 100%, the number average molecular weight by gel permeation chromatography (GPC) is $\overline{Mn}=8,900$, with the molecular weight distribution represented by the ratio ralative to the weight average molecular weight being $\overline{Mw}/\overline{Mn}=1.16$. The GPC measurement conditions are shown below.

(a) GPC=LC-6A produced by Shimazu Seisakusho
(b) Eluent=THF
(c) Column temperature=40° C.

Subsequently, after 0.0023 mol pf bis(2-ethylhexyl)-phosphate of lanthanum metal is added into the polymerized solution, 3.5 kg of a cyclohexane solution containing 20 wt. % of purified and dried 1,3-butadiene is charged, followed further by polymerization at 65° C. for 3 hours. At this point, a part of the polymerized solution is sampled for analysis to find that polymerization conversion of butadiene is 98%. Further, the polymer at this point is found to be a mixture of polymers containing a large amount of styrene-butadiene diblock polymer as clearly seen from the GPC measurement results shown in Table 1. The bound styrene concentration distribution in FIG. 1 is calculated by measuring the molecular weight distribution from the refractive index in GPC with styrene concentration correction and also measuring the styrene concentration from UV-ray absorbance. The polymer as a whole is found to have $\overline{Mn}=32,600$, and $\overline{Mw}/\overline{Mn}=1.40$.

Also, from FIG. 1, it can be seen that most of the polymers are styrene-butadiene diblock polymers, although containing small amounts of styrene homopolymers and butadiene homopolymers. The polymer content of the diblock polymer calculated from these GPC measurement results is 87%.

The polymerized solution is further subjected to the reaction at 65° C. for 1 hour by charging diphenylcarbonate as the terminal coupling agent in an amount of equal mols to the magnesium amount remaining in the reactor. As the result of the coupling reaction, the molecular weight of the polymer became $\overline{Mn} = 64,000$, $\overline{Mw}/\overline{Mn} = 1.45$, thus indicating a great extent of increase in molecular weight. The final polymer recovery is 97%.

EXAMPLE 2

Example 1 was repeated except that 2.0 kg of a cyclohexane solution containing 20 wt. % of styrene and 3.0 kg of a cyclohexane solution containing 20 wt. % of 1,3-butadiene are used as the monomers.

EXAMPLE 3

Example 1 is repeated except that 1.0 kg of a cyclohexane solution containing 20 wt. % of styrene and 4.0 kg of a cyclohexane solution containing 20 wt. % of 1,3-butadiene were used as the monomers.

EXAMPLE 4

Example 1 is repeated except that the polymerization conditions of 1,3-butadiene are changed to 50° C. and 24 hours.

EXAMPLE 5

Example 1 is repeated except that 0.0085 mol of dibutylmagnesium and 0.017 mol of sec-butyllithium are used as the catalyst components.

EXAMPLE 6

A polymerization reactor of 10 liter volume equipped with a stainless steel stirrer internally replaced with nitrogen gas is charged with 0.5 kg of a cyclohexane solution containing 20 wt. % of previously purified and dried 1,3-butadiene and 1.5 kg of a cyclohexane solution containing 20 wt. % of purified and dried styrene, and then 0.0113 mol of dibutylmagnesium and 0.0113 mol of sec-butyllithium as the catalyst components, and 0.034 mol of tetrahydrofuran (THF) as the polymerization accelerator were added, followed by polymerization at 65° C. for 3 hours.

Subsequently, after 0.0023 mol of bis(2ethylhexyl)phosphate of lanthanum metal is added into the polymerized solution, 3.5 kg of cyclohexane solution containing 20 wt. % of purified and dried 1,3-butadiene is charged, followed further by polymerization at 65° C. 3 hours.

The polymerized solution is further subjected to the reaction at 65° C. for 1 hour by charging diphenylcarbonate as the terminal coupling agent in an amount of equal mols to the magnesium amount remaining in the reactor.

EXAMPLE 7

A polymerization reactor of 10 liter volume equipped with a stainless steel stirrer internally replaced with nitrogen gas is charged with 1.5 kg of a cyclohexane solution containing 20 wt. % of purified and dried styrene, and then 0.0113 mol of dibutylmagnesium and 0.0113 mol of sec-butyllithium as the catalyst components, and 0.034 mol of tetrahydrofuran (THF) as the polymerization accelerator are added, followed by polymerization at 65° C. for 3 hours.

Subsequently, after 0.0023 mol gf bis(2ethylhexyl)phosphate of lanthanum metal is added into the polymerized solution, 3.3 kg of cyclohexane solution containing 20 wt. % of purified and dried 1,3-butadiene and 0.2 kg of a cyclohexane solution containing 20 wt. % of purified and dried isoprene is charged, followed further by polymerization at 65° C. for 3 hours.

The polymerized solution is further subjected to the reaction at 65° C. for 1 hour by charging diphenylcarbonate as the terminal coupling agent in an amount of equal mols to the magnesium amount remaining in the reactor.

EXAMPLE 8

A polymerization reactor of 10 liter volume equipped with a stainless steel stirrer replaced internatally with nitrogen is charged with 0.7 kg of a cyclonally hexane solution containing 20 wt. % of styrene previously purified and dried, and then 0.0038 mol of barium dinonyl phenoxide, 0.0057 mol of dibutylmagnesium, 0.0057 mol of sec-butyllithium and 0.008 mol of triethylaluminum are added, followed by polymerization at 70° C. for 2 hours. At this point, a small amount of the polymerized solution is sampled from the reactor for analysis. As the result, polymerization conversion by gas chromatograph analysis is 97%, the number average molecular weight Mn by gel permeation chromatography (GPC) analysis is 9,600, and the molecular weight distribution represented by the ratio relative to the weight average molecular weight is $\overline{Mw}/\overline{Mn} = 1.16$.

Next, into the polymerized solution is charged 3.5 kg of a cyclohexane solution containing 20 wt. % of, purified and dried 1,3-butadiene, and polymerization is further conducted at 65° C. for 3 hours. Also, at this point, a part of the polymerized solution is sampled for analysis to find that the polymerization conversion of butadiene is 90%. The polymer as a whole at this point is found to have $\overline{Mn} = 58,000$, $\overline{Mw}/\overline{Mn} = 1.23$.

Into the polymerized solution is further added 0.8 kg of a cyclohexane solution containing 20 Wt.% of purified and dried styrene, and polymerization is further continued at 70° C. for 3 hours. When a part of the polymerized solution is simpled for analysis, the final conversion of butadiene is found to be 99%, and the whole conversion of styrene 87%.

COMPARATIVE EXAMPLE 1

Example 1 was repeated except that no bis(2ethylhexyl)phosphate of lanthanum metal is added during polymerization.

COMPARATIVE EXAMPLE 2

Example 8 is repeated except that only 0.017 mol of sec-butyllithium is used as the catalyst component.

COMPARATIVE EXAMPLE 3

Example 1 is repeated except that 0.0067 mol of dibutylmagnesium, 0.0067 mol of sec-butyllithium and 0.0014 mol of bis(2-ethylhexyl)phosphate of lanthanum metal are used as the polymerization catalyst, and 0.020 mol of tetrahydrofuran is used as the polymerization accelerator, and no diphenylcarbonate which is the terminal coupling agent is used.

The structures of the polymers obtained in Examples 1-8, Comparative Examples 1-3, and the polymer characteristics by using test strips press molded at 150° C. are shown in Table 1.

TABLE 1

| | | Example No. | | | | | | | | Comparative Example No. | | |
|---|---|---|---|---|---|---|---|---|---|---|---|---|
| | | 1 | 2 | 3 | 4 | 5 | 6 | 7 | 8 | 1 | 2 | 3 |
| Polymer structure | | | | | | | | | | | | |
| Polymer chain structure | | $(D-E)_3X$ (radial) | same as left | same as left | same as left | same as left | same as left | same as left | A-B-C (straight chain triblock) | $(D-E)_3X$ (radial) | A-B-C (straight chain triblock) | A-B (diblock) |
| 1,4-Trans content at *1 butadiene portion | (%) | 87 | 87 | 89 | 92 | 82 | 83 | 89 | 84 | 53 | 52 | 88 |
| Bound styrene *1 content | (wt %) | 30.4 | 40.7 | 20.1 | 30.9 | 30.3 | 30.1 | 30.3 | 26.2 | 29.8 | 30.0 | 30.2 |
| Weight average *2 molecular weight | ($\times 10^4$) | 9.3 | 9.5 | 9.5 | 9.2 | 9.3 | 9.7 | 9.4 | 8.2 | 7.9 | 9.1 | 6.1 |
| Molecular weight *2 distribution | ($\overline{Mw}/\overline{Mn}$) | 1.45 | 1.47 | 1.41 | 1.50 | 1.43 | 1.43 | 1.46 | 1.27 | 1.24 | 1.15 | 1.40 |
| Polymer characteristics | | | | | | | | | | | | |
| M.P. of butadiene *3 portion | (°C.) | 65 | 71 | 80 | 86 | 45 | 74 | 52 | 55 | (none) | (none) | 75 |
| Glass transition *3 temp. of butadiene portion | (°C.) | −91 | −92 | −92 | −93 | −89 | −89 | −92 | −90 | −94 | −94 | −91 |
| Glass transition *3 temp. of styrene portion | (°C.) | 97 | 98 | 94 | 98 | 95 | 88 | 95 | 85 | 95 | 94 | 97 |
| M I *4 | (g/10 min.) | 1.7 | 2.1 | 1.1 | 2.3 | 1.2 | 1.5 | 1.9 | 2.1 | 2.4 | 1.7 | 3.4 |
| Hardness *5 | (JIS-A) | 92 | 94 | 97 | 99 | 86 | 89 | 92 | 86 | 82 | 80 | 92 |
| Strength *5 | (kg/cm²) | 340 | 380 | 300 | 380 | 280 | 210 | 260 | 220 | 190 | 150 | 120 |
| Elongation *5 | (%) | 700 | 520 | 720 | 550 | 750 | 580 | 740 | 780 | 650 | 580 | 180 |
| Residual elongation *5 at break | (%) | 560 | 400 | 580 | 420 | 480 | 450 | 500 | 550 | 40 | 30 | 90 |
| Resilience *6 | (%) | 58 | 56 | 60 | 60 | 57 | 57 | 56 | 56 | 54 | 53 | 56 |
| Shape recovery *7 temp. | (°C.) | 60 | 65 | 70 | 80 | 40 | 65 | 45 | 50 | shape not fixed | shape not fixed | not recovered |
| Shape recovery *7 | (%) | 95 | 90 | 95 | 85 | 80 | 90 | 95 | 90 | — | — | 40 |

Note:
*1 Measured according to the Hampton method by using IR-spectrophotometer.
*2 Measured by gel permeation chromatography.
*3 Measured by differential scanning calorimeter.
*4 Test temperature 192° C., test load 2.16 kg.
*5 Measured according to JIS K-6301.
*6 Measured by Dunlop Flexometer at 25° C.
*7 A test strip of 5 mm × 2 mm × 10 cm is bent at an angle of 180° at a temperature of 80° C., and quenched as such to 20° C. to fix the shape. Next, the temperature of the test strip is gradually raised and the temperature at which the angle becomes 90° is defined as the shape recovery temperature. Further, the temperature is raised to 80° C., and the restoration degree of the bent angle is expressed as the restoration percentage.

EXAMPLE 9

Polymerization is carried out in the same manner as in Example 1 except for using isoprene in place of butadiene. Styrene conversion after completion of polymerization is found to be 100%, and isoprene conpolymerization version 84%. The structure of the polymer obtained and the polymer characteristics by using a test strip press molded at 150° C. are shown in Table 2.

TABLE 2

| Polymer structure | | |
|---|---|---|
| Polymer chain structure | | $(D-E)_{\overline{3}}X$ |
| 1,4-Trans content at isoprene *1 portion | (%) | 94 |
| Bound styrene content *1 | (wt %) | 31.2 |
| Weight average molecular weight *2 | ($\times 10^4$) | 8.8 |
| Molecular weight *2 distribution | ($\overline{Mw}/\overline{Mn}$) | 1.47 |
| Polymer characteristics | | |
| M.P. of isoprene portion *3 | (°C.) | 46 |
| Glass transition temp. of *3 styrene portion | (°C.) | 95 |
| M I *4 | (g/10 min.) | 2.0 |
| Hardness *5 | (JIS-A) | 85 |
| Strength *5 | (kg/cm$^2$) | 220 |
| Elongation *5 | (%) | 580 |
| Residual elongation at *5 break | (%) | 470 |
| Resilience *6 | (%) | 54 |
| Shape recovery temp. *7 | (°C.) | 35 |
| Shape recovery *7 | (%) | 85 |

Note:
*1 Measured by NMR
*2~7 Are the same as in Examples 1~8.

EXAMPLES 10–13

A pressure glass bottle of 700 ml volume internally replaced with nitrogen gas and then stoppered is charged with 120 g of a cyclohexane solution containing 20 wt. % of styrene previously purified and dried. Next, as the catalyst components, 0.5 mmol of barium dinonyl phenoxide, 0.67 mmol of dibutylmagnesium, 0.67 mmol of sec-butyllithium, and 0.89 mmol of triethylaluminum are added and polymerization is carried out at 70° C. under stirring for 3 hours. At this point, a small amount of the polymerized solution is sampled for analysis. Next, 280 g of a cyclohexane solution containing 20 wt. % of purified and dried 1,3-butadiene is charged into the polymerized solution, followed further by polymerization at 65° C. for 3 hours. After the polymerization, the compound as shown in Table 3 is added as the terminal coupling agent in the amount shown in the same Table, and the reaction is carried out at 65° C. for 1 hour. After the reaction, the reaction is stopped by addition of 1 ml of methanol, and 0.3 parts of di-tert butylhydroxytoluene (hereinafter called BHT) is added per 100 parts by weight of the polymer and the solvent is evaporated to recover the polymer. The results a shown in Table 3.

TABLE 3

| | Coupling agent | | Monomer conversion | | Polymer characteristics | | | | Polymer composition |
|---|---|---|---|---|---|---|---|---|---|
| | | | Styrene conversion | Final | | | Trans-linkage | | |
| Ex-ample No. | Compound | Amount added (m mol) | on completion of styrene polymerization (%) | butadiene conversion (%) | Molecular weight, etc. | | content at butadiene portion (%) | M.P. (°C.) | Coupling polymer content (%) |
| | | | | | $\overline{Mw}$ ($\times 10^4$) | $\overline{Mw}/\overline{Mn}$ | | | |
| 10 | tetrachlorosilane | 0.50 | 100 | 92 | 13.5 | 1.31 | 84 | 68 | 84 |
| 11 | tetrachlorotin | 0.50 | 100 | 94 | 12.1 | 1.29 | 83 | 65 | 84 |
| 12 | ethyl adipate | 0.50 | 100 | 92 | 12.7 | 1.27 | 83 | 63 | 80 |
| 13 | diphenyl carbonate | 0.335 | 100 | 93 | 8.2 | 1.45 | 83 | 62 | 57 |

Polymerization conversions of styrene and butadiene are determined by analysis by gas chromatography, the molecular weights, the molecular weight distributions and the polymer compositions by analysis according to gel permeation chromatography (GPC) under the conditions shown in Example 1, the content of trans-1,4 linkage at the butadiene portion in the polymer by analysis by an IR-spectrophotometer and calculation according to the Hampton method and the melting point according to analysis by differential scanning calorimeter (DSC).

The polymer characteristics of the polymers obtained in Examples 10–13 by using the test strips pressmolded at 150° C. are shown in Table 4.

The measuring conditions are the same as in Table 1.

TABLE 4

| | | Example No. | | | |
|---|---|---|---|---|---|
| | | 10 | 11 | 12 | 13 |
| Polymer characteristics | | | | | |
| Glass transition temp. of styrene portion | (°C.) | 96 | 97 | 95 | 97 |
| M I | (g/10 min.) | 0.8 | 1.1 | 1.0 | 2.5 |
| Hardness | (JIS-A) | 87 | 86 | 86 | 85 |
| Strength | (kg/cm$^2$) | 360 | 370 | 350 | 240 |
| Elongation | (%) | 700 | 680 | 700 | 580 |
| Residual elongation at break | (%) | 560 | 540 | 550 | 460 |
| Resilience | (%) | 60 | 58 | 58 | 57 |
| Shape recovery temp. | (°C.) | 60 | 60 | 60 | 55 |
| Shape recovery | (%) | 95 | 95 | 95 | 85 |

EXAMPLES 14–24

The crystalline block copolymers shown in Example 1 are kneaded with other polymers, inorganic fillers or plasticizers at the compositions shown in Table 5 by a Laboplastmil (produced by Toyo Seiki Seisakusho K.K.) at 150° C. and a screw rotational number of 50 rpm for 5 minutes, and the physical properties of the respective compositions are evaluated. The results obtained are shown in Table 5.

TABLE 5

| | | Example No. | | | | | | | | | | |
|---|---|---|---|---|---|---|---|---|---|---|---|---|
| | | 14 | 15 | 16 | 17 | 18 | 19 | 20 | 21 | 22 | 23 | 24 |
| Crystalline block *1 copolymer | (parts) | 70 | 70 | 50 | 30 | 70 | 70 | 100 | 100 | 100 | 100 | 100 |

TABLE 5-continued

|  |  | Example No. | | | | | | | | | | |
|---|---|---|---|---|---|---|---|---|---|---|---|
|  |  | 14 | 15 | 16 | 17 | 18 | 19 | 20 | 21 | 22 | 23 | 24 |
| Trans-butadiene polymer *2 | (parts) | 30 | — | — | — | — | — | — | — | — | — | — |
| ε-caprolactone *3 | (parts) | — | 30 | 50 | 70 | — | — | — | — | — | — | — |
| polystyrene *4 | (parts) | — | — | — | — | 30 | — | — | — | — | — | — |
| polyphenyleneoxide *5 | (parts) | — | — | — | — | — | 30 | — | — | — | — | — |
| titanium oxide *6 | (parts) | 10 | 10 | 10 | 10 | 10 | 10 | — | — | 50 | 70 | 50 |
| talc *7 | (parts) | — | — | — | — | — | — | 10 | — | — | — | — |
| silica *8 | (parts) | — | — | — | — | — | — | — | 10 | — | — | — |
| dibutyl phthalate | (parts) | — | — | — | — | — | — | — | — | 10 | 20 | — |
| butyl stearate | (parts) | — | — | — | — | — | — | — | — | — | — | 10 |
| Hardness | (JIS-A) | 92 | 94 | 95 | 97 | 94 | 94 | 91 | 94 | 96 | 96 | 96 |
| Strength | (kg/cm²) | 260 | 280 | 250 | 190 | 320 | 340 | 220 | 260 | 200 | 160 | 190 |
| Elongation | (%) | 610 | 700 | 710 | 700 | 650 | 630 | 700 | 580 | 480 | 380 | 460 |
| Residual elongation at break | (%) | 450 | 560 | 560 | 570 | 510 | 500 | 570 | 430 | 400 | 320 | 390 |
| Shape recovery temp. | (°C.) | 60 | 60 | 58 | 55 | 65 | 65 | 60 | 65 | 65 | 70 | 65 |
| Shape recovery | (%) | 85 | 90 | 85 | 75 | 85 | 90 | 90 | 85 | 85 | 80 | 85 |

Note:
*1 Polymer shown in Example 1
*2 Butadiene polymer having a 1,4-trans linkage content of 84%, a weight average molecular weight of 79000, and a molecular weight distribution (Mw/Mn) of 1.18
*3 Placcel H-7 (produced by Dicel Kagaku Kogyo K.K.)
*4 Styrene polymer having a weight average molecular weight of 42000, and a molecular weight distribution (Mw/Mn) of 1.24
*5 Polyphenylene oxide having a weight average molecular weight of 12000
*6 Titanium white A-100 (produced by Ishihara Sangyo K.K.)
*7 Fine powder talc
*8 Nipsil VN3 (produced by Nippon Silica Kogyo K.K.)

EXAMPLES 25-33

A pressure glass bottle of 700 ml volume which is internally replaced with nitrogen gas and then stoppered is charged with 120 g of a cyclohexane solution containing 20 wt. % of styrene previously purified and dried. Then, 0.50 mmol of a barium salt of an organic acid shown in Table 6, 0.67 mmol of dibutylmagnesium (produced by Lithium Corp., n-Butyl : s-Butyl = about 1 : 1), 0.67 mmol of sec-butyllithium, and 0.89 mmol of triethylaluminum are added, and polymerization is carried out at 70° C. for 3 hours. At this point, a small amount of the polymerized solution is sampled for analysis. Next, 280 g of cyclohexane solution containing 20 wt. % of purified and dried 1,3-butadiene is charged into the polymerized solution, and polymerization is further carried out at 65° C. for 3 hours. Then, with addition of 0.67 mol of purified and dried methylbenzoate, the reaction is carried out at 65° C. for 30 minutes. After the reaction, polymerization is stopped with addition of 1 ml of methanol, and 0.3 parts by weight of BHT was added per 100 parts by weight of the polymer, followed by evaporation of the solvent to recover the polymer. The analyticla method is the same as in Example 1. The results are shown in Table 6.

The polymerization conversions of styrene and butadiene are determined by analysis according to gas chromatography, the molecular weight, molecular weight distribution and the composition of the polymers by analysis according to gel permeation chromatography (GPC) under the conditions in Example 1, the trans-1,4 linkage content at the butadiene portion in the polymer by analysis according to IR-spectrophotometer, calculation according to the Hampton method, and the melting point by analysis according to differential scanning calorimeter (DSC).

TABLE 6

| Example No. | Organic acid | Monomer conversion | | Polymer characteristics | | | | Polymer composition | | | |
|---|---|---|---|---|---|---|---|---|---|---|---|
|  |  | Styrene conversion on completion of styrene polymerization (%) | Final butadiene conversion (%) | Molecular weight, etc. | | Trans-linkage content at butadiene portion (%) | M.P. (°C.) | Coupling polymer content (%) | Diblock copolymer (%) | Butadiene homopolymer (%) | Styrene homopolymer (%) |
|  |  |  |  | $\overline{Mw}$ (× 10⁴) | $\overline{Mw}/\overline{Mn}$ |  |  |  |  |  |  |
| 25 | n-amyl alcohol | 100 | 93 | 8.3 | 1.31 | 84 | 70 | 84 | 8 | 6 | 2 |
| 26 | n-butane thiol | 100 | 94 | 8.5 | 1.33 | 84 | 68 | 85 | 7 | 5 | 3 |
| 27 | Versatic acid *1 | 100 | 94 | 8.1 | 1.32 | 84 | 69 | 83 | 9 | 5 | 3 |
| 28 | ethylene glycol monbutyl ether | 100 | 95 | 8.2 | 1.29 | 85 | 72 | 85 | 8 | 5 | 2 |
| 29 | diethylaminoethanol | 100 | 95 | 7.7 | 1.27 | 85 | 71 | 83 | 10 | 5 | 2 |
| 30 | di-n-butylamine | 100 | 95 | 7.8 | 1.28 | 84 | 68 | 83 | 9 | 6 | 2 |
| 31 | piperidine | 100 | 94 | 8.4 | 1.30 | 83 | 62 | 84 | 8 | 6 | 2 |
| 32 | tridecanesulfonic acid | 98 | 88 | 9.0 | 1.41 | 82 | 52 | 75 | 12 | 9 | 4 |
| 33 | dodecylbenzene- | 97 | 90 | 9.1 | 1.44 | 82 | 56 | 77 | 11 | 8 | 4 |

TABLE 6-continued

| Example No. | Monomer conversion | | Polymer characteristics | | | | Polymer composition | | | |
|---|---|---|---|---|---|---|---|---|---|---|
| | Styrene conversion on completion of styrene polymerization (%) | Final butadiene conversion (%) | Molecular weight, etc. | | Trans-linkage content at butadiene portion (%) | M.P. (°C.) | Coupling polymer content (%) | Diblock copolymer (%) | Butadiene homopolymer (%) | Styrene homopolymer (%) |
| Organic acid | | | $\overline{Mw}$ ($\times 10^4$) | $\overline{Mw}/\overline{Mn}$ | | | | | | |
| sulfonic acid | | | | | | | | | | |

Note: *1 Carboxylic acid mixture produced by Shell Chemical Co. (Versatic 10)

EXAMPLE 34

The experiment is practiced in quite the same manner as in Examples 25 to 33 except for using strontium dinonylphenoxide at the catalyst component (a). The results are shown in Table 7.

further 0.89 mmol of triethylaluminum is added, followed by polymerization at 70° C. while stirring for 3 hours. At this point, a small amount of the polymerized solution is sampled for analysis. Then, 280 g of a cyclohexane solution containing 20 wt. % of purified and dried 1,3-butadiene is charged into the polymerized

TABLE 7

| Example No. | Monomer conversion | | Polymer characteristics | | | | Polymer composition | | | |
|---|---|---|---|---|---|---|---|---|---|---|
| | Styrene conversion on completion of styrene polymerization (%) | Final butadiene conversion (%) | Molecular weight, etc. | | Trans-linkage content at butadiene portion (%) | M.P. (°C.) | Coupling polymer content (%) | Diblock copolymer (%) | Butadiene homopolymer (%) | Styrene homopolymer (%) |
| | | | $\overline{Mw}$ ($\times 10^4$) | $\overline{Mw}/\overline{Mn}$ | | | | | | |
| 34 | 99 | 94 | 7.9 | 1.37 | 82 | 61 | 81 | 10 | 7 | 2 |

EXAMPLES 35-43 AND COMPARATIVE EXAMPLES 4 AND 5

A pressure glass bottle of 700 ml volume which is internally replaced with nitrogen gas and then stoppered is charged with 120 g of a cyclohexane solution containing 20 wt. % of styrene previously purified and dried. Next, as the catalyst components, 0.5 mmol of barium dinonyl phenoxide, the organic magnesium and the organic compound of lithium as shown in Table 8 are added in the amounts shown in the same Table, and solution, followed further by polymerization at 65° C. for 3 hours. Next, 0.67 mmol of purified and dried methylbenzoate is added and the reaction is carried out at 65° C. for 30 minutes. After the reaction, polymerization is stopped by addition of 1 ml of methanol and 0.3 parts by weight of BHT are added per 100 parts by weight of the polymer, followed by evaporation of the solvent to recover the polymer. The results are shown in Table 8. The analytical methods are the same as shown in Examples 25-33.

TABLE 8

| Example or Comp. Ex. No. | Organic magnesium name | Amount added (mmol) | Organic compound of lithium Name | Amount added (mmol) | Polymerization accelerator Name | Amount added (mmol) | Monomer conversion — Styrene conversion on completion of Styrene polymerization (%) | Final butadiene conversion (%) | Polymer Characteristics — Molecular weight, etc. Mw (×10^4) | Mw/Mn | Trans-linkage content at butadiene portion (%) | M.P.*4 (°C) | Coupling polymer content (%) | Polymer composition — Diblock copolymer (%) | Butadiene homopolymer (%) | Styrene homopolymer (%) |
|---|---|---|---|---|---|---|---|---|---|---|---|---|---|---|---|---|
| Ex. 35 | MAGALA-BEM*1 | 0.67 | n-butyllithium | 0.67 | — | 0 | 100 | 94 | 7.8 | 1.35 | 84 | 69 | 83 | 9 | 5 | 3 |
| Ex. 36 | MAGALA-7.5E*2 | 0.67 | n-butyllithium | 0.67 | — | 0 | 100 | 93 | 7.6 | 1.33 | 84 | 63 | 82 | 9 | 5 | 4 |
| Ex. 37 | dibutyl magnesium*3 | 0.84 | n-butyllithium | 0.33 | — | 0 | 99 | 92 | 8.1 | 1.35 | 85 | 76 | 81 | 10 | 5 | 4 |
| Ex. 38 | dibutyl magnesium*3 | 0.67 | n-butyllithium | 0.67 | — | 0 | 100 | 94 | 7.7 | 1.32 | 84 | 70 | 84 | 8 | 4 | 4 |
| Ex. 39 | dibutyl magnesium*3 | 0.50 | n-butyllithium | 1.00 | — | 0 | 100 | 90 | 8.3 | 1.34 | 81 | 55 | 84 | 8 | 4 | 4 |
| Ex. 40 | dibutyl magnesium*3 | 0.67 | sec-butyllithium | 0.67 | — | 0 | 100 | 95 | 7.9 | 1.33 | 83 | 63 | 83 | 9 | 5 | 3 |
| Ex. 41 | dibutyl magnesium*3 | 1.00 | lithium isopropoxide | 1.00 | — | 0 | 100 | 93 | 8.1 | 1.36 | 83 | 62 | 78 | 12 | 7 | 3 |
| Ex. 42 | dibutyl magnesium*3 | 0.67 | sec-butyllithium | 0.67 | tetrahydrofuran | 2.00 | 100 | 95 | 8.0 | 1.31 | 85 | 77 | 80 | 11 | 6 | 3 |
| Ex. 43 | dibutyl magnesium*3 | 0.67 | sec-butyllithium | 0.67 | triethylamine | 2.00 | 100 | 95 | 7.7 | 1.30 | 85 | 76 | 80 | 11 | 7 | 2 |
| Comp. Ex. 4 | dibutyl magnesium*3 | 1.00 | — | 0 | — | 0 | 29 | 62 | 2.9 | 1.99 | 83 | 32 | — | — | — | — |
| Comp. Ex. 5 | — | 0 | n-butyllithium | 2.00 | — | 0 | 77 | 52 | 3.6 | 2.15 | 73 | none | — | — | — | — |

Note:
*1 produced by Texas Alkyl Co.; molecular structure: n-$C_4H_9MgC_2H_5$
*2 produced by Texas Alkyl Co.; molecular structure: 7.5(n-$C_4H_9$)$_2$Mg($C_2H_5$)$_3$)Al: amount added shown in amount of magnesium component
*3 produced by Lithium Corp.
*4 measured by differential scanning calorimeter (DSC)

EXAMPLES 44–49

A pressure glass bottle of 700 ml volume which is internally replaced with nitrogen gas and then stoppered is charged with 120 g of a cyclohexane solution containing 20 wt. % of styrene previously purified and dried. Next, as the catalyst components, 0.5 mmol of barium dinonyl phenoxide, 0.67 mmol of dibutylmagnesium (produced by Lithium Corp., n-butyl : s-butyl=about 1 : 1) 0.67 mmol of sec-butyllithium and the organic aluminum or the organic zinc shown in Table 9 in the amounts shown in Table 9 were added, followed by polymerization at 70° C. while stirring for 3 hours. At this point, a small amount of the polymerized solution is sampled for analysis. Then, 280 g of a cyclohexane solution containing 20 wt. % of purified and dried 1,3-butadiene is charged into the polymerized solution, followed further by polymerization at 65° C. for 3 hours. Next, 0.67 mmol of purified and dried methylbenzoate is added and the reaction is carried out at 65° C. for 30 minutes. After the reaction, reaction is stopped by addition of 1 ml of methanol and 0.3 parts by weight of BHT are added per 100 parts by weight of the polymer, followed by evaporation of the solvent to recover the polymer. The results are shown in Table 9. The analytical methods are the same as shown in Examples 25–33.

EXAMPLES 50–57

A pressure glass bottle of 700 ml volume which is as internally replaced with nitrogen gas and then stoppered is charged with 120 g of a cyclohexane solution containing 20 wt. % of styrene previously purified and dried. Next, as the catalyst components, 0.5 mmol of barium dinonyl phenoxide, 0.67 mmol of dibutylmagnesium (produced by Lithium Corp., n-butyl : s-butyl=about 1 : 1), 0.67 mmol of sec-butyllithium and 0.89 mmol of triethylaluminum were added, followed by polymerization at 70° C. while stirring for 3 hours. At this point, a small amount of the polymerized solution is sampled for analysis. Then, 280 g of a cyclohexane solution containing 20 wt. % of purified and dried 1,3-butadiene is charged into the polymerized solution, followed further by polymerization at 65° C. for 3 hours. After the polymerization, the compound as shown in Table 10 is added as the terminal coupling agent in the amount shown in the same Table, and the reaction is carried out at 65° C. for one hour. After the reaction, reaction is stopped by addition of 1 ml of methanol and 0.3 parts by weight of BHT are added per 100 parts by weight of the polymer, followed by evaporation of the solvent to recover the polymer. The results are shown in Table 10. The analytical methods are the same as shown in Examples 25–33.

TABLE 9

| | Catalyst system | | Monomer conversion | | Polymer characteristics | | | | Polymer composition | | | |
|---|---|---|---|---|---|---|---|---|---|---|---|---|
| Example No. | Name | Amount Added (mmol) | Styrene conversion on completion of styrene polymerization (%) | Final butadiene conversion (%) | Molecular weight etc. $\overline{Mw}$ (× 10$^4$) | | $\overline{Mw}/\overline{Mn}$ | Trans-linkage content at butadiene portion (%) | M.P. (°C.) | Coupling polymer content (%) | Di-block copolymer (%) | Butadiene homopolymer (%) | Styrene homopolymer (%) |
| 44 | triisobutyl-aluminum | 0.89 | 100 | 95 | 7.8 | 1.33 | 84 | 65 | 84 | 9 | 5 | 2 |
| 45 | tri-n-hexyl-aluminum | 0.89 | 100 | 95 | 8.1 | 1.37 | 84 | 60 | 82 | 10 | 6 | 2 |
| 46 | tri-iso-propyl-aluminium | 0.89 | 100 | 94 | 8.3 | 1.31 | 84 | 62 | 82 | 10 | 6 | 2 |
| 47 | diethyl-aluminum monohydride | 0.59 | 96 | 91 | 8.0 | 1.41 | 82 | 51 | 78 | 12 | 7 | 3 |
| 48 | diethylzinc | 1.34 | 100 | 90 | 8.1 | 1.40 | 83 | 56 | 72 | 14 | 10 | 4 |
| 49 | di-isobutyl-zinc | 1.34 | 100 | 92 | 8.1 | 1.39 | 83 | 53 | 76 | 13 | 7 | 4 |

TABLE 10

| | Coupling agent | | Monomer conversion | | Polymer characteristics | | | | Polymer Composition |
|---|---|---|---|---|---|---|---|---|---|
| Example No. | Compound | Amount added (mmol) | Styrene conversion on completion of styrene polymerization (%) | Final butadiene conversion (%) | Molecular weight, etc. $\overline{Mw}$ (× 10$^4$) | $\overline{Mw}/\overline{Mn}$ | Trans-linkage content at butadiene portion (%) | M.P. (°C.) | Coupling polymer content (%) |
| 50 | tetrachlorosilane | 0.50 | 100 | 92 | 13.5 | 1.31 | 84 | 68 | 84 |
| 51 | dimethyl-diethylsilane | 1.00 | 100 | 92 | 6.8 | 1.33 | 84 | 69 | 78 |
| 52 | tetrachlorotin | 0.50 | 100 | 94 | 12.1 | 1.29 | 83 | 65 | 84 |
| 53 | ethyl adipate | 0.50 | 100 | 92 | 12.7 | 1.27 | 83 | 63 | 80 |
| 54 | diphenyl carbonate | 0.335 | 100 | 93 | 8.2 | 1.45 | 83 | 62 | 57 |
| 55 | diphenyl carbonate | 0.50 | 100 | 93 | 10.1 | 1.27 | 83 | 64 | 82 |
| 56 | diphenyl carbonate | 0.67 | 100 | 93 | 10.6 | 1.25 | 83 | 63 | 87 |
| 57 | diphenyl carbonate | 1.34 | 100 | 92 | 9.4 | 1.39 | 82 | 57 | 72 |

EXAMPLE 58

The experiment is practiced in quite the same manner as in Example 40 except for using isoprene as the conjugated diene monomer. The results are shown in Table 11.

dried 1,3-butadiene into the polymerized solution, and polymerization is further carried out at 65° C. for 3 hours. Then, with addition of 0.67 mol of purified and dried methylbenzoate, the reaction is carried out at 65° C. for 30 minutes. After the reaction, polymerization is stopped with addition of 1 ml of methanol, and 0.3 parts

TABLE 11

| | Monomer conversion | | Polymer characteristics | | | | Polymer composition | | | |
|---|---|---|---|---|---|---|---|---|---|---|
| | Styrene conversion on completion of styrene polymerization | Final isoprene conversion | Molecular weight, etc. | | 1,4-Trans content at isoprene portion | M.P. | Coupling polymer content | Diblock copolymer | Isoprene homo-polymer | Styrene homo-polymer |
| Example No. | (%) | (%) | $\overline{Mw}$ ($\times 10^4$) | $\overline{Mw}/\overline{Mn}$ | (%) | (°C.) | (%) | (%) | (%) | (%) |
| 58 | 100 | 89 | 8.7 | 1.37 | 89 | 42 | 81 | 9 | 7 | 3 |

EXAMPLES 59–67 AND COMPARATIVE EXAMPLES 6 AND 7

A pressure glass bottle of 700 ml volume which is internally replaced with nitrogen gas and then stoppered is charged with 120 g of a cyclohexane solution containing 20 wt. % of styrene previously purified and dried. Next as the catalyst components, the organic magnesium and the organic compound of lithium as shown in Table 12 are added in the amount shown in the same Table. At this point, small amount of the polymerized solution is sampled for analysis. Next, after addition of 0.15 mmol of bis(2-ethylhexyl)phosphate of lanthanum metal into the polymerized solution, 280 g of cyclohexane solution containing 20 wt. % of purified and dried 1,3-butadiene into the polymerized solution, and polymerization is further carried out at 65° C. for 3 hours. Then, with addition of 0.67 mol of purified and dried methylbenzoate, the reaction is carried out at 65° C. for 30 minutes. After the reaction, polymerization is stopped with addition of 1 ml of methanol, and 0.3 parts by weight of BHT is added per 100 parts by weight of the polymer, followed by evaporation of the solvent to recover the polymer. The results are shown in Table 12.

The polymerization conversions of styrene and butadiene are determined by analysis according to gas chromatography, the molecular weight, molecular weight distribution and the composition of the polymers by analysis according to gel permeation chromatography (GPC) under the conditions in Example 1, the trans-1,4 linkage content at the butadiene portion in the polymer by analysis according to IR-spectrophotometer, calculation according to the Hampton method, and the melting point by analysis according to differential scanning calorimeter (DSC).

TABLE 12

| Example or Comp. Ex. No. | Catalyst system | | | | | | Monomer conversion | | Polymer Characteristics | | | | | Polymer composition | | |
|---|---|---|---|---|---|---|---|---|---|---|---|---|---|---|---|---|
| | Organic magnesium | | Organic compound of lithium | | Polymerization accelerator | | Styrene conversion on completion of Styrene polymerization (%) | Final butadiene conversion (%) | Molecular weight, etc. | | Trans-linkage content at butadiene portion (%) | M.P.*4 (°C.) | Coupling polymer content (%) | Diblock co-polymer (%) | Butadiene homo-polymer (%) | Styrene homo-polymer (%) |
| | name | Amount added (mmol) | Name | Amount added (mmol) | Name | Amount added (mmol) | | | Mw (×10⁴) | Mw/Mn | | | | | | |
| Ex. 59 | MAGALA-BEM*1 | 0.67 | n-butyl-lithium | 0.67 | — | 0 | 100 | 91 | 9.6 | 1.51 | 88 | 92 | 81 | 8 | 7 | 4 |
| 60 | MAGALA-7.5E*2 | 0.67 | n-butyl-lithium | 0.67 | — | 0 | 90 | 89 | 9.2 | 1.55 | 88 | 93 | 79 | 8 | 9 | 4 |
| 61 | dibutyl*3 magnesium | 0.84 | n-butyl-lithium | 0.33 | — | 0 | 96 | 94 | 10.1 | 1.53 | 89 | 96 | 79 | 9 | 8 | 4 |
| 62 | dibutyl*3 magnesium | 0.67 | n-butyl-lithium | 0.67 | — | 0 | 100 | 95 | 9.5 | 1.49 | 88 | 92 | 80 | 10 | 6 | 4 |
| 63 | dibutyl*3 magnesium | 0.50 | n-butyl-lithium | 1.00 | — | 0 | 100 | 97 | 8.9 | 1.52 | 85 | 74 | 83 | 8 | 6 | 3 |
| 64 | dibutyl*3 magnesium | 0.67 | sec-butyl-lithium | 0.67 | — | 0 | 100 | 93 | 9.4 | 1.62 | 88 | 92 | 85 | 6 | 6 | 3 |
| 65 | dibutyl*3 magnesium | 1.00 | lithium iso-propoxide | 1.00 | — | 0 | 98 | 97 | 9.0 | 1.60 | 88 | 90 | 79 | 7 | 10 | 4 |
| 66 | dibutyl*3 magnesium | 0.67 | sec-butyl-lithium | 0.67 | tetra-hydro-furan | 2.00 | 100 | 98 | 9.7 | 1.45 | 88 | 91 | 84 | 7 | 6 | 3 |
| 67 | dibutyl*3 magnesium | 0.67 | sec-butyl-lithium | 0.67 | triethyl-amine | 2.00 | 100 | 98 | 9.9 | 1.61 | 86 | 79 | 84 | 8 | 5 | 3 |
| Comp. Ex. 6 | dibutyl*3 magnesium | 1.00 | — butyl-lithium | 0 | — | 0 | 0 | — | — | — | — | — | — | — | — | — |
| 7 | — | 0 | n-butyl-lithium | 2.00 | — | 0 | 100 | 100 | 8.3 | 1.42 | 57 | none | 83 | 9 | 5 | 3 |

Note:
*1 produced by Texas Alkyl Co.; molecular structure: n-C₄H₉MgC₂H₅
*2 produced by Texas Alkyl Co.; molecular structure: 7.5(n-C₄H₉)Mg(C₂H₅)₃Al: amount added shown in amount of magnesium component
*3 produced by Lithium Corp.
*4 measured by differential scanning calorimeter (DSC)

EXAMPLES 68-74

A pressure glass bottle of 700 ml volume which is internally replaced with nitrogen gas and then stoppered is charged with 120 g of a cyclohexane solution containing 20 wt. % of styrene previously purified and dried. Next, as the catalyst components, 0.67 mmol of dibutyl magnesium (produced by Lithium Corp., n-butyl : s-butyl=about 1 : 1), 0.67 mmol of sec-butyl lithium are added, followed by polymerization at 70° C. while stirring for 3 hours. At this point, small amount of the polymerized solution is sampled for analysis. Then, after addition of 0.15 mmol of bis(2ethylhexyl)phosphate of the rare earth metal shown in Table 13, 280 g of a cyclohexane solution containing 20 wt. % of purified and dried 1,3-butadiene is charged into the polymerized solution, followed further by polymerization at 65° C. for 3 hours. Next, 0.67 mmol of purified and dried methylbenzoate is added and the reaction is carried out at 65° C. for 30 minutes. After the reaction, the reaction is stopped by addition of 1 ml of methanol and 0.3 parts by weight of BHT are added per 100 parts by weight of the polymer, followed by evaporation of the solvent to recover the polymer. The analytical methods are the same as shown in Examples 59-67. The results are shown in Table 13.

TABLE 13

| Example No. | Rare earth metal | Monomer conversion | | Polymer characteristics | | | | Polymer composition | | | |
|---|---|---|---|---|---|---|---|---|---|---|---|
| | | Styrene conversion on completion of styrene polymerization (%) | Final butadiene conversion (%) | Molecular weight, etc. | | Trans-linkage content at butadiene portion (%) | M.P. (°C.) | Coupling polymer content (%) | Diblock co-polymer (%) | Butadiene homo-polymer (%) | Styrene homo-polymer (%) |
| | | | | Mw (× 10⁴) | Mw/Mn | | | | | | |
| 68 | Ce | 100 | 88 | 9.2 | 1.59 | 88 | 86 | 76 | 10 | 10 | 4 |
| 69 | Pr | 100 | 79 | 8.2 | 1.57 | 83 | 61 | 72 | 12 | 11 | 5 |
| 70 | Nd | 100 | 84 | 8.4 | 1.61 | 84 | 63 | 75 | 12 | 8 | 5 |
| 71 | Pm | 100 | 82 | 7.9 | 1.73 | 82 | 56 | 71 | 11 | 13 | 5 |
| 72 | Sm | 100 | 66 | 9.2 | 1.66 | 82 | 54 | 75 | 13 | 11 | 11 |
| 73 | Eu | 100 | 87 | 9.5 | 1.69 | 81 | 44 | 73 | 14 | 14 | 9 |
| 74 | Gd | 100 | 82 | 7.1 | 1.37 | 80 | 40 | 67 | 15 | 14 | 4 |

EXAMPLES 75-83

Examples 68-74 are repeated except that the lanthanum metal salts of organic acids as shown in Table 14 are used as the organic acid salts of rare earth metals. The results are shown in Table 14.

TABLE 14

| Example No. | Organic acid | Monomer conversion | | Polymer characteristics | | | | Polymer composition | | | |
|---|---|---|---|---|---|---|---|---|---|---|---|
| | | Styrene conversion on completion of styrene polymerization (%) | Final butadiene conversion (%) | Molecular weight, etc. | | Trans-linkage content at butadiene portion (%) | M.P. (°C.) | Coupling polymer content (%) | Diblock co-polymer (%) | Butadiene homo-polymer (%) | Styrene homo-polymer (%) |
| | | | | Mw (× 10⁴) | Mw/Mn | | | | | | |
| 75 | ethylhexanoic acid | 100 | 92 | 9.3 | 1.62 | 88 | 91 | 75 | 9 | 11 | 5 |
| 76 | Versatic acid*¹ | 100 | 90 | 9.3 | 1.67 | 88 | 90 | 78 | 8 | 9 | 5 |
| 77 | naphthenic acid | 100 | 91 | 9.5 | 1.71 | 87 | 83 | 74 | 10 | 10 | 6 |
| 78 | rosin acid | 100 | 87 | 8.5 | 1.77 | 87 | 85 | 74 | 10 | 10 | 6 |
| 79 | nonylphenol | 100 | 84 | 8.9 | 1.79 | 86 | 80 | 68 | 11 | 12 | 9 |
| 80 | decanethionic acid | 100 | 80 | 7.7 | 1.90 | 86 | 78 | 63 | 13 | 14 | 10 |
| 81 | P₁*² | 100 | 96 | 8.6 | 1.61 | 88 | 91 | 80 | 8 | 9 | 3 |
| 82 | P₂*³ | 100 | 96 | 8.8 | 1.61 | 88 | 93 | 80 | 8 | 9 | 3 |
| 83 | P₃*⁴ | 100 | 95 | 8.5 | 1.58 | 88 | 94 | 81 | 9 | 7 | 3 |

Note:
*¹Carboxylic acid mixture produced by Shell Chemical Co. (Versatic 10)

*²P₁: 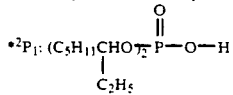

*³P₂: 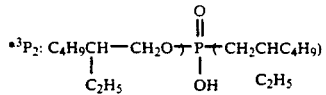

*⁴P₃: 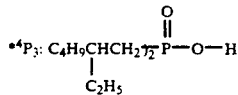

EXAMPLES 84-91

A pressure glass bottle of 700 ml volume which is internally replaced with nitrogen gas and then stoppered is charged with 120 g of a cyclohexane solution containing 20 wt. % of styrene previously purified and dried. Next, as the catalyst components, 0.67 mmol of dibutylmagnesium, 0.67 mmol of sec-butyllithium are added, followed by polymerization at 65° C. while stirring for 3 hours. At this point, small amount of the polymerized solution is sampled for analysis. Then, after addition of 0.15 mmol of bis(2-ethylhexyl)phosphate of the rare earth metal shown in Table 15, 280 g of a cyclohexane solution containing 20 wt. % of purified and dried 1,3-butadiene is charged into the polymerized solution, followed further by polymerization at 65° C. for 3 hours. After polymerization, further the compound as shown in Table 15 is added as the terminal coupling agent in the amount shown in the same Table and the reaction is carried out at 65° C. for 1 hour. After the reaction, the reaction is stopped by addition of 1 ml of methanol and 0.3 parts by weight of BHT were added per 100 parts by weight of the polymer, followed by evaporation of the solvent to recover the polymer. The results are shown in Table 15. The analytical methods are the same as shown in Examples 59–67.

TABLE 15

| Example No. | Coupling agent Compound | Amount added (m mol) | Monomer conversion Styrene conversion on completion of styrene polymerization (%) | Final butadiene conversion (%) | Polymer characteristics Molecular weight, etc. $\overline{Mw}$ ($\times 10^4$) | $\overline{Mw}/\overline{Mn}$ | Trans-linkage content at butadiene portion (%) | M.P. (°C.) | Polymer composition Coupling polymer content (%) |
|---|---|---|---|---|---|---|---|---|---|
| 84 | tetrachlorosilane | 0.50 | 100 | 96 | 11.7 | 1.67 | 88 | 93 | 62 |
| 85 | dimethyldiethylsilane | 1.00 | 100 | 94 | 6.9 | 1.75 | 88 | 93 | 51 |
| 86 | tetrachlorotin | 0.50 | 100 | 95 | 11.5 | 1.70 | 88 | 93 | 58 |
| 87 | ethyl adipate | 0.50 | 100 | 94 | 12.1 | 1.66 | 89 | 95 | 62 |
| 88 | diphenyl carbonate | 0.335 | 100 | 95 | 8.9 | 1.69 | 88 | 93 | 54 |
| 89 | diphenyl carbonate | 0.50 | 100 | 96 | 10.2 | 1.45 | 88 | 94 | 87 |
| 90 | diphenyl carbonate | 0.67 | 100 | 97 | 11.6 | 1.46 | 89 | 96 | 85 |
| 91 | diphenyl carbonate | 1.34 | 100 | 95 | 9.8 | 1.51 | 88 | 94 | 74 |

We claim:

1. A resin of a crystalline block copolymer having a vinyl aromatic compound content of 20 to 40 wt. % contained therein and containing at least a radial structure represented by the formula $(D-E)_nX$ in the polymer chain,
  wherein D represents a block comprising a homopolymer of a vinylaromatic compound or a copolymer of a vinylaromatic compound with another vinylaromatic compound or a conjugated diene compound having a glass transition temperature of not lower than 50° C. and a weight average molecular weight in the range of from 2,000 to 100,000; E represents a block comprising a homopolymer of a conjugated diene compound, or a copolymer of a conjugated diene compound with another conjugated diene compound or a copolymer of a conjugated diene compound having less than 20 wt. % of a vinylaromatic compound having a glass transition temperature of not higher than 10° C., crystallinity at 25° C., a weight average molecular weight in the range of from 10,000 to 500,000 and a 1,4-translinkage ratio at the conjugated diene portion of 80% or higher; X represents a terminal coupling agent; and n is an integer of from 2 to 10,
  said resin having been prepared by a process comprising polymerizing successively the monomers selected from vinylaromatic monomers, conjugated diene monomers or a mixture thereof, by using a composite catalyst comprising the catalyst components (a), (b) and (c), or (a), (b), (c) and (d) shown below, and then carrying out the reaction with addition of a coupling agent:
  (a) is an organic compound of barium or strontium;
  (b) is an organic compound of lithium;
  (c) is an organomagnesium compound; and
  (d) is an organoaluminum or organozinc compound.

2. The resin according to claim 1, wherein the amount of the catalyst component (c) used per 100 g of the monomer is in the range of from 0.1 to 50 mmols, the molar ratio of the catalyst components (b) and (c) is in the range of (b)/(c)=0.1 to 10, and the molar ratio of the catalysts components of (a) and (c) is in the range of (a)/(c)=0.005 to 10.

3. The resin according to claim 1, wherein the vinylaromatic compound is styrene and the conjugated diene compound is 1,3-butadiene.

4. A composition of crystalline block copolymers, comprising at least 30 wt. % of the crystalline block copolymer resin according to claim 1.

5. The composition of crystalline block copolymers according to claim 4, which further contains 5 to 100 parts by weight of an inorganic filler per 100 parts by weight of said composition.

6. The resin according to claim 1, wherein the vinyl aromatic compound is styrene, alpha-methylstyrene, p-methylstyrene, m-methylstyrene, o-methylstyrene or vinyl-naphthalene.

7. The crystalline block copolymer according to claim 1, wherein the conjugated diene compound is butadiene, isoprene or piperylene.

8. The crystalline block copolymer according to claim 1, wherein the terminal coupling agent is a multi-epoxide, a multi-isocyanate, a multi-imine, a multi-aldehyde, a multi-ketone, a multi-acid anhydride, a multi-ester, a mono-ester, a multi-halide, carbon monoxide or carbon dioxide.

9. The crystalline block copolymer according to claim 1, wherein the terminal coupling agent is a silicon multi-halide.

10. The crystalline block copolymer according to claim 9, wherein the silicon multi-halide is tetrachlorosilane, trichloromonomethylsilane or dichlorodiethylsilane.

11. The crystalline block copolymer according to claim 1, wherein the terminal coupling agent is a tin multi-halide.

12. The crystalline block copolymer according to claim 11, wherein the tin multi-halide is tetrachloro-tin or trichloromonomethyl-tin.

13. The crystalline block copolymer according to claim 1, wherein the terminal coupling agent is diphenylcarbonate, methylbenzoate, ethylbenzoate or diethyladipate.

14. A resin of a crystalline block copolymer having a vinyl aromatic compound content of 20 to 40 wt. % contained therein and containing at least a radial structure represented by the formula $(D-E)_nX$ in the polymer chain,
   wherein D represents a block comprising a homopolymer of a vinylaromatic compound or a copolymer of a vinylaromatic compound with another vinylaromatic compound or a conjugated diene compound having a glass transition temperature of not lower than 50° C. and a weight average molecular weight in the range of from 2,000 to 100,000; E represents a block comprising a homopolymer of a conjugated diene compound, or a copolymer of a conjugated diene compound with another conjugated diene compound or a copolymer of a conjugated diene compound having less than 20 wt. % of a vinylaromatic compound having a glass transition temperature of not higher than 10° C., crystallinity at 25° C., a weight average molecular weight in the range of from 10,000 to 500,000 and a 1,4-trans-linkage ratio at the conjugated diene portion of 80% or higher; X represents a terminal coupling agent; and n is an integer of from 2 to 10,
   said resin having been prepared by a process comprising homopolymerizing a vinylaromatic monomer or copolymerizing said monomer with another vinylaromatic monomer or a conjugated diene monomer by using a composite catalyst comprising the catalyst components (b) and (c) as shown below, then homopolymerizing a conjugated diene monomer or copolymerizing said monomer with another conjugated diene monomer or an aromatic vinyl monomer with addition of the catalyst component (e) shown below, and further carrying out the reaction with addition of a coupling agent;
   (b) is an organic compound of lithium;
   (c) is an organomagnesium compound; and
   (e) is a rare earth metal (Ln) salt of an organic acid.

15. The resin according to claim 14, wherein the amount of the catalyst component (c) used per 100 g of the monomer is in the range of from 0.05 to 50 mmols, the molar ration of the catalyst components (b) and (c) is in the range of (b)/(c)=0.1 to 10 and the molar ratio of the catalyst components (e) and (c) is in the range of (e)/(c)=0.01 to 1.

16. The resin according to claim 14, wherein the rare earth metal is lanthanum.

17. The resin according to claim 15, wherein the rare earth metal is lanthanum.

18. The resin according to claim 14, wherein (e) is a lanthanum salt of an organic phosphate.

19. The resin according to claim 15, wherein (e) is a lanthanum salt of an organic phosphate.

20. The resin according to claim 14, wherein the vinylaromatic compound is styrene and the conjugated diene compound is 1,3-butadiene.

21. A composition of crystalline block copolymers comprising at least 30 wt. % of the crystlaline block copolymer resin according to claim 14.

22. The composition of crystalline block copolymer according to claim 21, which further contains 5 to 100 parts by weight of an inorganic filler per 100 parts by weight of said composition.

23. The resin according to claim 14 wherein the vinyl aromatic compound is styrene, alpha-methylstyrene, p-methylstyrene, m-methylstyrene, o-methylstyrene or vinyl-naphthalene.

24. The crystalline block copolymer according to claim 14, wherein the conjugated diene compound is butadiene, isoprene or piperylene.

25. The crystalline block copolymer according to claim 14, wherein the terminal coupling agent is a multiepoxide, a multi isocyanate, a multi-imine, a multi-aldehyde, a multi-ketone, a multi-acid anhydride, a multi-ester, a mono-ester, a multi-halide, carbon monoxide or carbon dioxide.

26. The crystlalien block copolymer according to claim 14, wherein the terminal coupling agent is a silicon multi-halide.

27. The crystalline block copolymer according to claim 26 wherein the silicon multi-halide is tetrachlorosilane, trichloromonomethylsilane or dichlorodiethylsilane.

28. The crystalline block copolymer according to claim 14, wherein the terminal coupling agent is a tin multi-halide.

29. The crystalline block copolymer according to claim 28, wherein the tin-multi-halide is tetrachloro-tin or trichloromonomethyl-tin.

30. The crystalline block copolymer according to claim 14, wherein the terminal coupling agent is diphenylcarbonate, methylbenzoate, ethylbenzoate or diethyladipate.

31. A resin of a crystalline block copolymer having a vinyl compound content of 20 to 40 wt. % contained therein and containing at least a triblock chain represented by the formula A-B-C in the polymer chain,
   wherein A and C each represent a block comprising a homopolymer of a vinyl aromatic compound or a copolymer of a vinylaromatic compound with another vinylaromatic compound or a conjugated diene compound having a glass trnasition temperature of not lower than 50° C. and a weight average molecular weight in the range of from 2,000 to 100,000 and A and C may have either the same or different structures; B represents a block comprising a homopolymer of a conjugated diene compound or a copolymer of a conjugated diene compound with another conjugated diene compound or a copolymer of a conjugated diene compound having less than 20 wt. % of a vinylaromatic compound having a glass transition temperature of not higher than 10° C., a crystallinity of 25° C. and a weight average molecular weight in the range of from 25,000 to 1,000,000 and a 1,4-trans-linkage ratio at the conjugated diene portion of 80% or higher,
   said resin having been prepared by a process comprising polymerizing successively the monomers selected from vinylaromatic monomers, conjugated diene monomers or a mixture thereof, by using a composite catalyst comprising the catalyst components (a), (b) and (c), or (a), (b), (c) and (d) shown below:
   (a) is an organic compound of barium or strontium;
   (b) is an organic compound of lithium;
   (c) is an organomagnesium compound; and
   (d) is an organoaluminum or organozinc compound.

32. The resin according to claim 31, wherein the amount of the catalyst component (c) used per 100 g of the monomer is in the range of from 0.1 to 50 mmols, the molar ratio of the catalyst components (b) and (c) is in the range of (b)/(c)=0.1 to 10, and the molar ratio of the catalysts component of (a) and (c) is in the range of (a)/(c)=0.005 to 10.

33. The resin according to claim 31, wherein the vinylaromatic compound is styrene and the conjugated diene compound is 1,3-butadiene.

34. A composition of crystalline block copolymers, comprising at least 30 wt. % of the crystalline block copolymer resin according to claim 31.

35. The composition of crystalline block copolymers according to claim 34, which further contains 5 to 100 parts by weight of an inorganic filler per 100 parts by weight of said composition.

36. The resin according to claim 31, wherein the vinyl aromatic compound is styrene, alpha-methylstyrene, p-methylstyrene, m-methylstyrene, o-methylstyrene or vinyl-naphthalene.

37. The crystalline block copolymer according to claim 31, wherein the conjugated diene compound is butadiene, isoprene or piperylene.

* * * * *